United States Patent
Nunome et al.

(10) Patent No.: US 12,335,981 B2
(45) Date of Patent: Jun. 17, 2025

(54) BASE STATION, TERMINAL, TRANSMISSION METHOD, AND RECEPTION METHOD

(71) Applicant: Panasonic Intellectual Property Corporation of America, Torrance, CA (US)

(72) Inventors: Tomoya Nunome, Ishikawa (JP); Hidetoshi Suzuki, Kanagawa (JP); Quan Kuang, Langen (DE); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 17/766,509

(22) PCT Filed: Aug. 28, 2020

(86) PCT No.: PCT/JP2020/032611
§ 371 (c)(1),
(2) Date: Apr. 4, 2022

(87) PCT Pub. No.: WO2021/070508
PCT Pub. Date: Apr. 15, 2021

(65) Prior Publication Data
US 2024/0064763 A1  Feb. 22, 2024

(30) Foreign Application Priority Data
Oct. 7, 2019 (JP) .................................. 2019-184566

(51) Int. Cl.
*H04W 72/232* (2023.01)

(52) U.S. Cl.
CPC .................................. *H04W 72/232* (2023.01)

(58) Field of Classification Search
CPC . H04W 72/232; H04W 72/56; H04W 72/542; H04W 16/14; H04W 72/0453;
(Continued)

(56) References Cited

U.S. PATENT DOCUMENTS

| 2018/0368116 | A1 | 12/2018 | Liao et al. |
| 2021/0067268 | A1* | 3/2021 | Seo ............ H04L 25/0238 |
| 2021/0400699 | A1* | 12/2021 | Nory ............ H04L 1/1819 |

FOREIGN PATENT DOCUMENTS

| CN | 109952803 A | 6/2019 |
| JP | 2017208584 A | 11/2017 |
| WO | WO 2019143164 A1 | 7/2019 |

OTHER PUBLICATIONS

Indian Office Action, dated Dec. 4, 2023, for Indian Patent Application No. 202247020327. (7 pages).
(Continued)

*Primary Examiner* — Dady Chery
(74) *Attorney, Agent, or Firm* — Seed IP Law Group LLP

(57) ABSTRACT

This base station is provided with: a control circuit which determines a disposition method for a downlink control channel signal in at least one among a first period before a timing based on a carrier sense and a second period after the timing based on the carrier sense on the basis of information about at least one among the number of times a downlink control channel signal is blind-decoded and the number of resources for channel estimation; and a transmission circuit which transmits the downlink control channel signal on the basis of the determined disposition method.

10 Claims, 18 Drawing Sheets

(58) Field of Classification Search
CPC .... H04W 72/54; H04L 1/0007; H04L 1/0046; H04L 1/0072; H04L 27/0006; H04L 27/2601; H04L 5/001; H04L 5/0053
See application file for complete search history.

(56) References Cited

OTHER PUBLICATIONS

Extended European Search Report dated Feb. 7, 2024, for the corresponding European Patent Application No. 23198687.8, 9 pages.

InterDigital, Inc., "DL signals and channels for gNB initiated COT," R1-1909009, Agenda Item: 7.2.2.1.2, 3GPP TSG RAN WG1 #98, Prague, CZ, Aug. 26-30, 2019, 4 pages.

3GPP, "$3^{rd}$ Generation Partnership Project; Technical Specification Group Radio Access Network; NR; Physical channels and modulation (Release 15)," 3GPP TS 38.211 V15.7.0, Sep. 2019 (97 pages).

3GPP, "$3^{rd}$ Generation Partnership Project; Technical Specification Group Radio Access Network; NR; Multiplexing and channel coding (Release 15)," 3GPP TS 38.212 V15.7.0, Sep. 2019 (101 pages).

3GPP, "$3^{rd}$ Generation Partnership Project; Technical Specification Group Radio Access Network; NR; Physical layer procedures for control (Release 15)," 3GPP TS 38.213 V15.7.0, Sep. 2019 (108 pages).

3GPP, "$3^{rd}$ Generation Partnership Project; Technical Specification Group Radio Access Network; NR; Physical layer procedures for data (Release 15)," 3GPP TS 38.214 V15.7.0, Sep. 2019 (106 pages).

3GPP, "$3^{rd}$ Generation Partnership Project; Technical Specification Group Radio Access Network; NR; NR and NG-RAN Overall Description; Stage 2 (Release 15)," 3GPP TS 38.300 V15.6.0, Jun. 2019 (99 pages).

3GPP, "$3^{rd}$ Generation Partnership Project; Technical Specification Group Radio Access Network; NR; Physical channels and modulation (Release 15)," 3GPP TS 38.211 V15.6.0, Jun. 2019 (97 pages).

3GPP, "$3^{rd}$ Generation Partnership Project; Technical Specification Group Radio Access Network; Study on Scenarios and Requirements for Next Generation Access Technologies; (Release 15)," 3GPP TR 38.913 V15.0.0, Jun. 2018 (39 pages).

3GPP, "$3^{rd}$ Generation Partnership Project; Technical Specification Group Services and System Aspects; System Architecture for the 5G System; Stage 2 (Release 16)," 3GPP TS 23.501, V16.1.0, Jun. 2019 (368 pages).

International Search Report, mailed Nov. 17, 2020, for International Application No. PCT/JP2020/032611 (3 pages with English translation).

LG Electronics, "Physical layer design of DL signals and channels for NR-U," R1-1908533, Agenda Item: 7.2.2.1.2, 3GPP TSG RAN WG1 #98, Prague, CZ, Aug. 26-30, 2019. (14 pages).

* cited by examiner

| SCS [kHz] | Maximum number of monitored PDCCH candidates per slot and per serving cell |
|---|---|
| 15 | 44 |
| 30 | 36 |
| 60 | 22 |
| 120 | 20 |

| SCS [kHz] | Maximum number of non-overlapped CCEs per slot and per serving cell |
|---|---|
| 15 | 56 |
| 30 | 36 |
| 60 | 48 |
| 120 | 32 |

FIG. 6

BASE STATION, TERMINAL, TRANSMISSION METHOD, AND RECEPTION METHOD

TECHNICAL FIELD

The present disclosure relates to a base station, a terminal, a transmission method, and a reception method.

BACKGROUND ART

In 3rd Generation Partnership Project (3GPP), the specification for Release 15 New Radio access technology (NR) has been completed for realization of 5th Generation mobile communication systems (5G). NR supports functions for realizing Ultra Reliable and Low Latency Communication (URLLC) in conjunction with high speed and high capacity that are basic requirements for enhanced Mobile Broadband (eMBB) (see, e.g., Non-Patent Literatures (hereinafter referred to as "NPLs") 1 to 4).

CITATION LIST

Non-Patent Literature

NPL 1

3GPP TS 38.211 V15.7.0, "NR; Physical channels and modulation (Release 15)," September 2019

NPL 2

3GPP TS 38.212 V15.7.0, "NR; Multiplexing and channel coding (Release 15)," September 2019

NPL 3

3GPP TS 38.213 V15.7.0, "NR; Physical layer procedure for control (Release 15)," September 2019

NPL 4

3GPP TS 38.214 V15.7.0, "NR; Physical layer procedures for data (Release 15)," September 2019

SUMMARY OF INVENTION

However, a transmission method for transmitting a downlink signal in an unlicensed band has not comprehensively been studied.

One non-limiting exemplary embodiment of the present disclosure facilitates providing a base station, a terminal, a transmission method, and a reception method capable of improving the transmission efficiency for transmission of downlink signals in unlicensed bands.

A terminal according to an exemplary embodiment of the present disclosure includes: control circuitry, which, in operation, determines a mapping method for mapping a downlink control channel signal to at least one of a first period and a second period, the determining being based on information on at least one of a number of times of blind decoding for the downlink control channel signal and a number of resources for channel estimation, the first period being on or before a timing based on carrier sensing, the second period being on or after the timing based on the carrier sensing; and transmission circuitry, which, in operation, transmits the downlink control channel signal based on the mapping method determined.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to one exemplary embodiment of the present disclosure, it is possible to improve the transmission efficiency for transmission of downlink signals in unlicensed bands.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 6 illustrates an example of the maximum number of times of blind detection (BD) and the maximum number of control channel elements (CCEs);

DESCRIPTION OF EMBODIMENTS

Hereinafter, embodiments of the present disclosure will be described in detail with reference to the accompanying drawings.

5G NR System Architecture and Protocol Stack>

3GPP has been working at the next release for the 5th generation cellular technology. simply called 5G, including the development of a new radio access technology (NR) operating in frequencies ranging up to 100 GHz. The first version of the 5G standard was completed at the end of 2017, which allowed proceeding to 5G NR standard-compliant trials and commercial deployments of terminals (e.g., smartphones).

Figure 1:
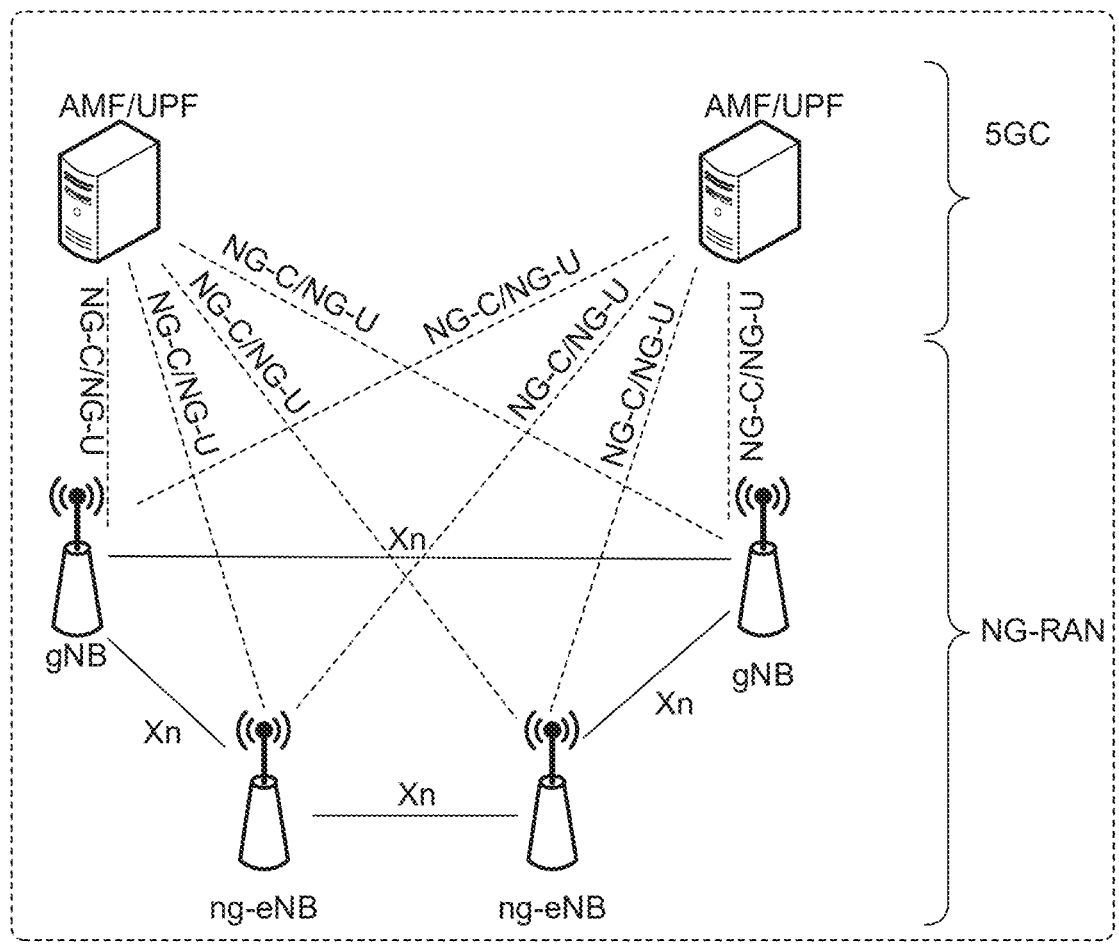
FIG. 1 illustrates an exemplary architecture of a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function)(e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see section 6.4 of TS 38.300). RLC (Radio Link Control, see section 6.3 of TS 38.300) and MAC (Medium Access Control, see section 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC, and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1-10^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration $T_u$ and the subcarrier spacing $\Delta f$ are directly related through the formula $\Delta f = 1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

<Functional Split Between NG-RAN and 5GC in 5G NR>

Figure 2:
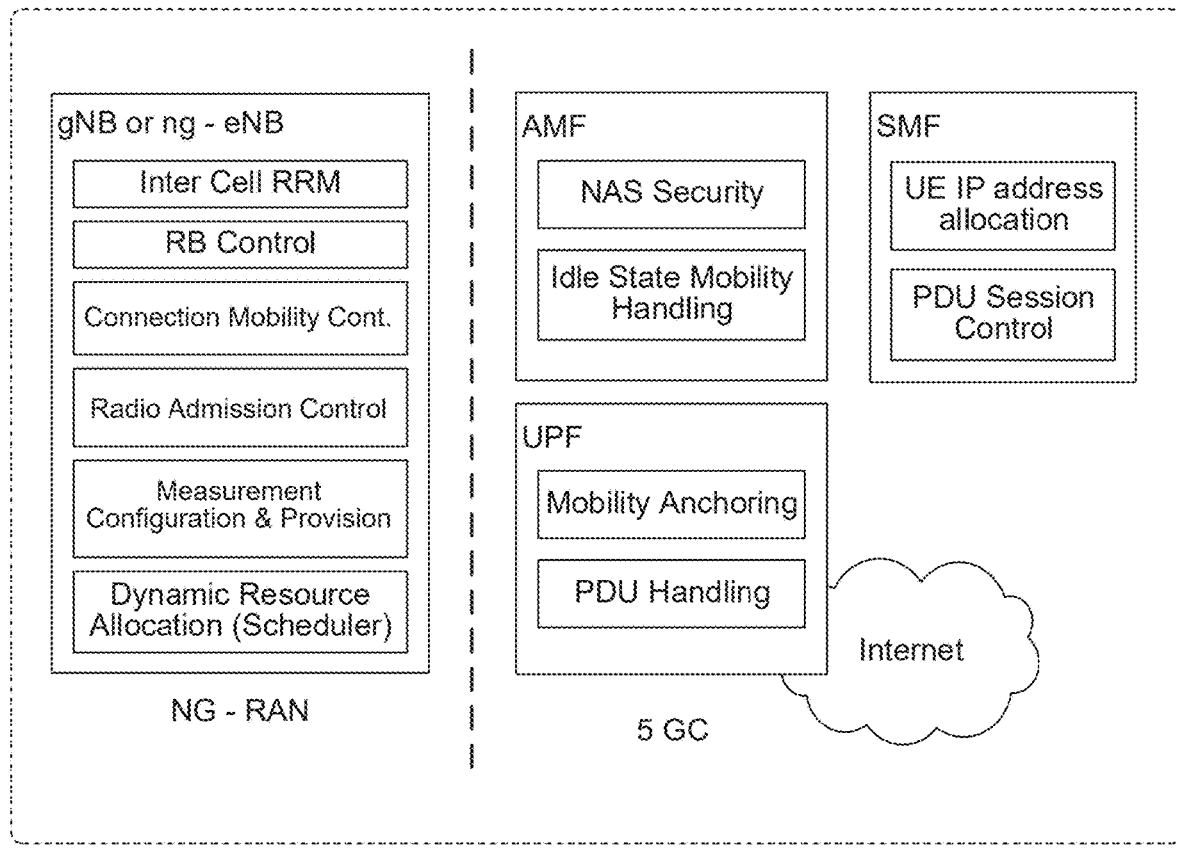
FIG. 2 schematically illustrates a functional split between NG-RAN and 5GC.

FIG. 2 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

Radio Resource Management functions such as Radio Bearer Control, Radio Admission Control, Connection Mobility Control, and dynamic allocation (scheduling) of both uplink and downlink resources to a UE;

IP header compression, encryption, and integrity protection of data;

Selection of an AMF during UE attachment in such a case when no routing to an AMF can be determined from the information provided by the UE;

Routing user plane data towards the UPF;

Routing control plane information towards the AMF;

Connection setup and release;

Scheduling and transmission of paging messages;

Scheduling and transmission of system broadcast information (originated from the AMF or an operation management maintenance function (OAM: Operation, Admission, Maintenance));

Measurement and measurement reporting configuration for mobility and scheduling;

Transport level packet marking in the uplink;

Session management;

Support of network slicing;

QoS flow management and mapping to data radio bearers;

Support of UEs in the RRC_INACTIVE state;

Distribution function for NAS messages;

Radio access network sharing;

Dual connectivity; and

Tight interworking between NR and E-UTRA.

The Access and Mobility Management Function (AMF) hosts the following main functions:

Function of Non-Access Stratum (NAS) signaling termination;

NAS signaling security;

Access Stratum (AS) security control;

Inter-Core Network (CN) node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing; and

Session Management Function (SMF) selection.

In addition, the User Plane Function (UPF) hosts the following main functions:

Anchor Point for intra-/inter-RAT mobility (when applicable);

External Protocol Data Unit (PDU) session point for interconnection to a data network;

Packet routing and forwarding;

Packet inspection and a user plane part of Policy rule enforcement;

Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping); and

Function of downlink packet buffering and downlink data indication triggering.

Finally, the Session Management Function (SMF) hosts the following main functions:

Session management;

UE IP address allocation and management;

Selection and control of UPF;

Configuration function for traffic steering at the User Plane Function (UPF) to route traffic to a proper destination;

Control part of policy enforcement and QoS; and

Downlink data indication.

<RRC Connection Setup and Reconfiguration Procedure>

Figure 3:
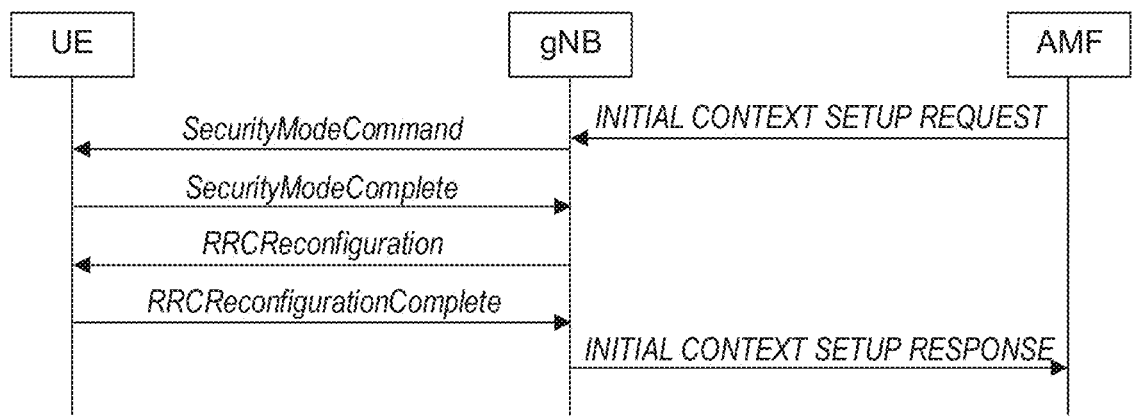
FIG. 3 is a sequence diagram of an RRC Connection Setup/Reconfiguration Procedure.

FIG. 3 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB informs the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which, in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

Usage Scenarios of IMT for 2020 and Beyond>

Figure 4:
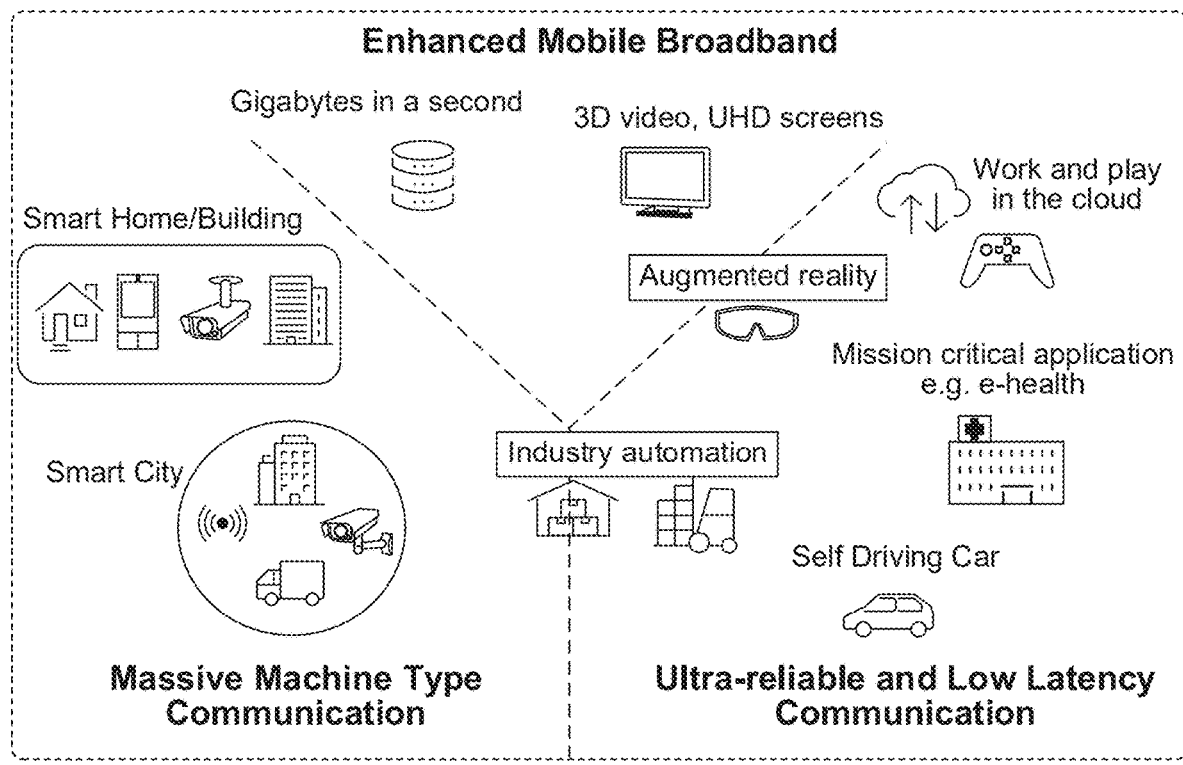
FIG. 4 schematically illustrates usage scenarios of enhanced Mobile BroadBand (eMBB), massive Machine Type Communications (mMTC), and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 4 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been identified such as factory automation, transport industry and electrical power distribution. The tighter requirements are higher reliability (up to $10^{-6}$ level), higher availability, packet sizes of up to 256 bytes, time synchronization down to the order of a few µs where the value can be one or a few µs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearer (DRB) together with the PDU Session, e.g., as illustrated above with reference to FIG. 3. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
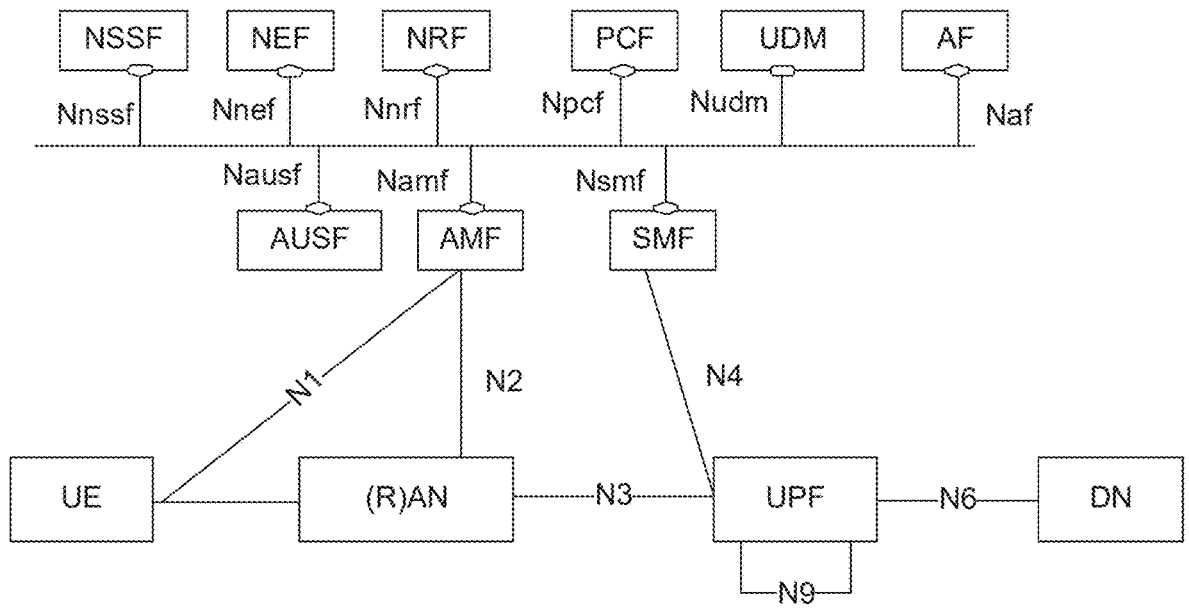
FIG. 5 is a block diagram illustrating an exemplary 5G system architecture for a non-roaming scenario

FIG. 5 illustrates a 5G NR non-roaming reference architecture (see TS 23.501 v16.1.0, section 4.23). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that includes: a transmitter, which, in operation, transmits a request containing a QoS requirement for at least one of URLLC, eMBB and mMTC services to at least one of functions (for example NEF, AMF, SMF, PCF, UPF, etc.) of the 5GC to establish a PDU session including a radio bearer between a gNodeB and a UE in accordance with the QoS requirement; and control circuitry, which, in operation, performs the services using the established PDU session.

For a terminal (also referred to as a user equipment (UE)), Release 15 NR defines the number of downlink control channels (e.g., PDCCHs: Physical Downlink Control Channels) in which blind decoding (or also referred to as monitoring) can be performed in one slot and the number of control channel elements (CCEs) in each PDCCH in which channel estimation can be performed. Note that, the number of PDCCHs in which blind decoding can be performed in one slot is also called, for example, the "maximum number of times of blind decoding" or the "maximum number of BDs." Further, the number of CCEs in a PDCCH in which channel estimation can be performed is also referred to as the "maximum number of CCEs." A base station (e.g., also referred to as gNB) performs PDCCH transmission based on, for example, the number of BDs or the number of CCEs assigned for each terminal.

Further, in Release 16 NR, NR-Unlicensed (NR-U) in which communication is performed based on an NR radio access scheme in an unlicensed frequency band (also referred to as a non-license-requiring band) has been studied. In the unlicensed frequency band, prior to transmission, each device performs carrier sensing (e.g., also referred to as Listen Before Talk (LBT)) to confirm whether or not another system, terminal, or the like is using a radio channel. In NR-U, for example, it is determined according to the result of LBT whether or not it is possible to perform transmission. Thus, a procedure for the terminal to detect the start of a series of downlink data transmissions (e.g., downlink burst (DL burst) has been studied. For example, in Release 16 NR, the DL burst detection based on the PDCCH has been studied.

[Maximum Number of BDs and Maximum Number of CCEs]

For example, the maximum number of BDs and the maximum number of CCEs at a non Carrier Aggregation (CC) time can be defined as illustrated in FIG. 6 (see, for example, NPL 3). The maximum number of BDs and the maximum number of CCEs illustrated in FIG. 6 indicate, for example, values for each terminal and for each slot.

In Release 15 NR, for example, PDCCH candidates larger in number than the maximum number (in other words, the upper limit) of BDs or the maximum number of CCEs illustrated in FIG. 6 may be configured for the terminal. In this case, a "dropping rule" (in other words, a rule for not allocating a PDCCH candidate and a PDCCH monitoring occasion) is defined as one method for configuring the number of actual PDCCH candidates such that it is equal to or smaller than the maximum number of BDs or the maximum number of CCEs illustrated in FIG. 6.

Note that the "PDCCH candidates" indicate candidates for PDCCHs received by the terminal. For example, the PDCCH monitoring occasion (or PDCCH reception occasion) indicates frequency and time resources for the PDCCH candidates.

In the dropping rule, for example, the following provisions may apply:
  Neither the PDCCH candidate nor the PDCCH monitoring occasion in a common search space (CSS) are dropped.
  When the configured PDCCH candidates are larger in number than the maximum number of BDs or the minimum number of CCEs in a UE-specific search space (USS), search spaces are dropped (in other words, no resource is assigned) in descending order of the identification numbers of the search spaces (e.g., referred to as "search space IDs (SS IDs)").
  The dropping rule is not applied to a Secondary cell. In other words, the dropping rule is applied to a Primary cell.

[DL Burst Detection]

Figure 7:
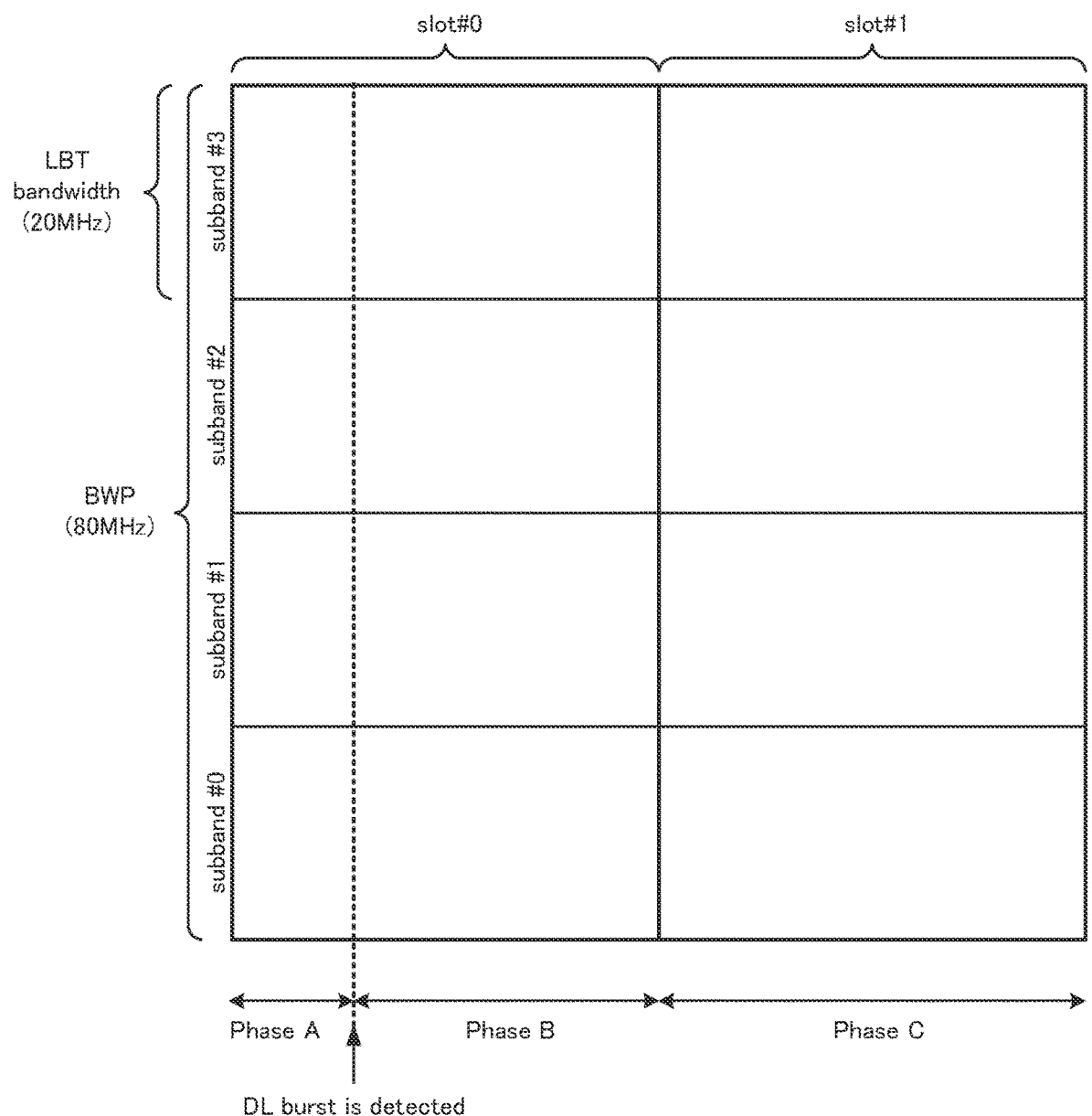
FIG. 7 illustrates an exemplary Phases of Downlink (DL) burst detection.

For the DL burst detection, for example, the following three phases have been discussed. FIG. 7 illustrates an example of three phases:
  Phase A: Before the DL burst detection;
  Phase B: After the DL burst detection and before the slot boundary (slot #0 in FIG. 7) is reached (partial slot); and
  Phase C: After the DL burst detection and after the slot boundary (slot #0 in FIG. 7) is reached (full slot).

The use of, for example, a Group common PDCCH (GC-PDCCH) has been discussed for the DL burst detection. For example, abase station transmits the GC-PDCCH at the beginning of the DL burst, and a terminal detects the GC-PDCCH on a configured PDCCH monitoring occasion. Upon successful detection of the GC-PDCCH, the terminal recognizes the transmission of the DL burst (in other words, detects the DL burst). Note that, it has been discussed that the GC-PDCCH includes, for example, information on a LBT subband (also referred to as LBT bandwidth) available to the base station, a slot format within a channel occupancy time (COT), or the like.

[CORESET and Search Space]

In Release 15 NR, for example, the number of control resource sets (CORESETs) or search spaces (SSs) that are regions in which the downlink control channel can be assigned for the terminal is specified as follows:
  CORESETs: 3 (per bandwidth part (BWP)), and
  SSs: 10 (per BWP).

For example, the bandwidth of the BWP is set to 80 MHz, and the bandwidth of a band (for example, referred to as "LBT subband") in which a terminal (or a base station) performs carrier sensing (for example, LBT) is set to 20 MHz. For example, when four LBT subbands are present in the BWP and a CORESET is mapped to each of the LBT subbands (in other words, when an individual CORESET is mapped to each of the LBT subbands), four CORESETs are configured for the terminal, which are larger in number than the above-mentioned specified number (three).

Therefore, it has been agreed in NR-U that, when a CORESET is mapped to fit in an LBT subband (in other words, in a closed manner), the same CORESET and a SS associated with the CORESET can be mapped to a plurality of subbands regardless of the aforementioned specified number (e.g., three).

Figure 8:
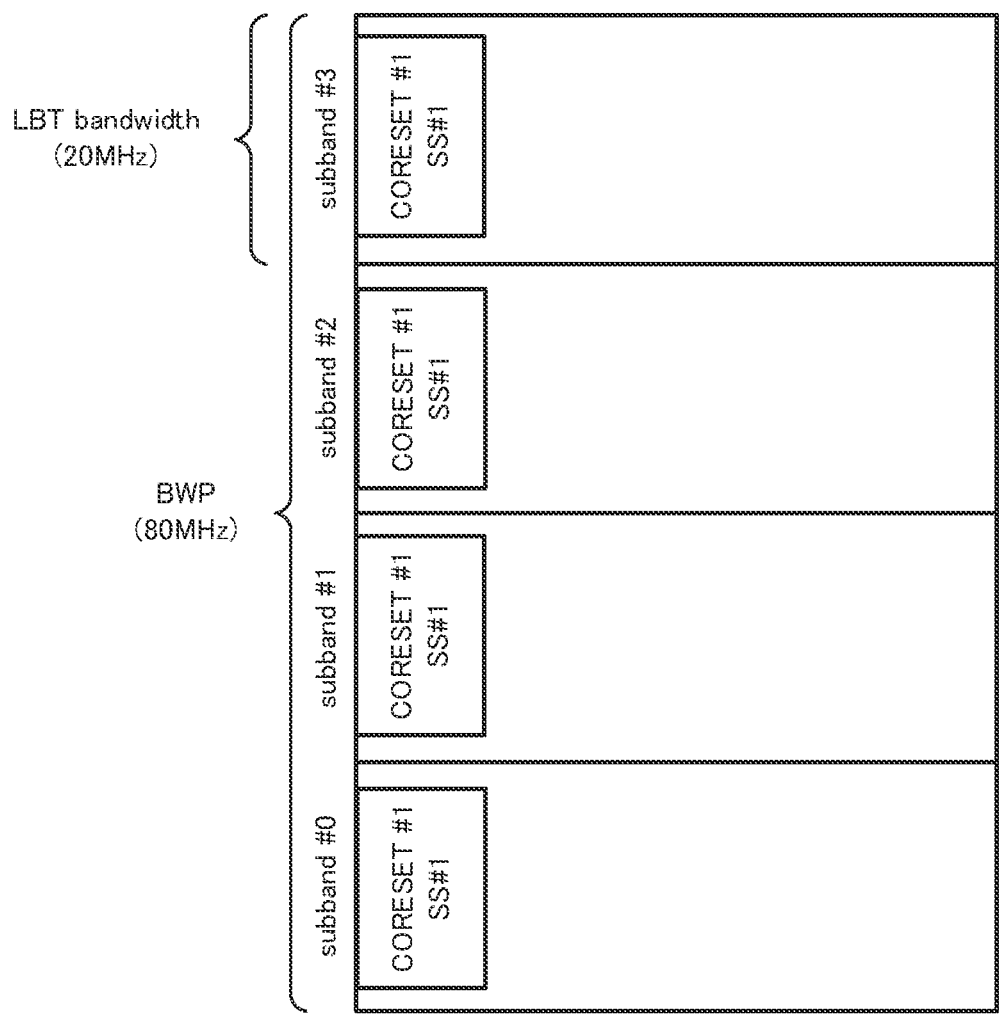
FIG. 8 illustrates exemplary mapping of a CORESET and a synchronization signal (SS) to a plurality of subbands.

FIG. 8 illustrates an example in which the same CORESET and SS are mapped to each of a plurality of (e.g., four) LBT subbands.

[Maximum Number of BDs and Maximum Number of CCEs and SS]

As described above, in NR-U, it has been agreed that the same CORESET and SS can be mapped to each of a plurality of subbands.

In addition, in NR-U, in order to suppress complexity of UE implementations, it has been agreed that the maximum number of BDs and the maximum number of CCEs specified in Release 15 NR will not be increased. Meanwhile, the SS may be configured for each of a plurality of LBT subbands, for example, on the assumption of a situation in which an LBT subband becomes unavailable due to a failure of the LBT (e.g., referred to as LBT failure).

Under the above-described limitation on the maximum number of BDs and the maximum number of CCEs, configuring the SS for each of a plurality of LBT subbands may reduce the efficiency of PDCCH candidate mapping.

Figure 9:
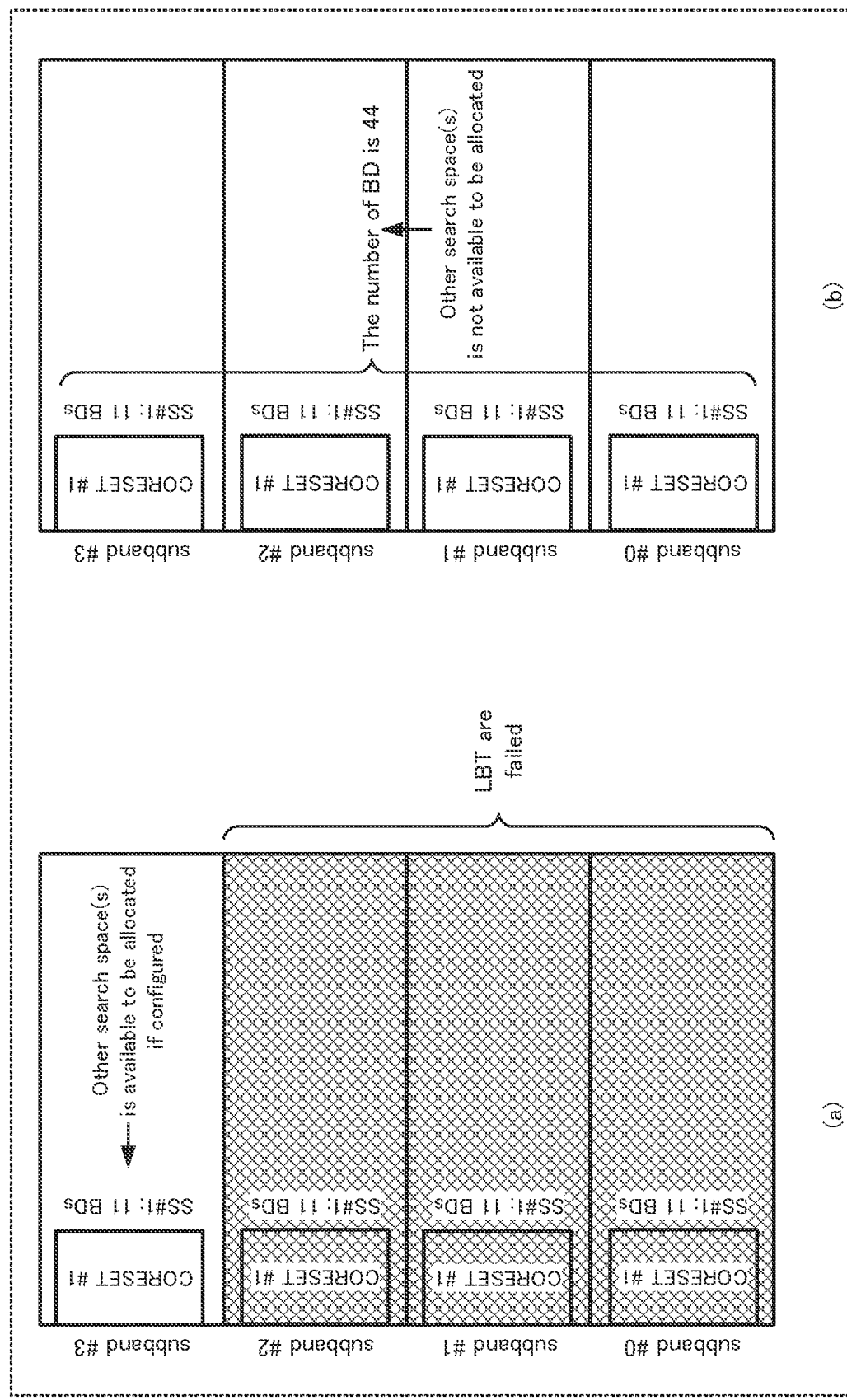
FIG. 9 illustrates an exemplary configuration of a PDCCH monitoring occasion.

FIG. 9 illustrates exemplary configurations of the PDCCH monitoring occasion.

In the examples illustrated in FIG. 9, the maximum number of BDs configured for the terminal is 44. Note that, in FIG. 9, for simplification of description, the maximum number of BDs is considered but the maximum number of CCEs is not considered. In the following description, the expression "consider" may be replaced by "be based on" or "use." and the expression "not consider" may be replaced by "be not based on" or "not use." Further, in FIG. 9, four LBT subbands (e.g., LBT subbands #0 to #3) are described as an example, but the number of LBT subbands is not limited to four and may be other numbers. In addition, in FIG. 9, the PDCCH monitoring occasions corresponding to the number (=11) of BDs is configured for each of subbands #0 to #3.

For example, at (a) in FIG. 9, it is assumed that the results of LBT indicate that LBT fails in subbands #0 to #2, whereas subband #3 is available. Further, at (b) in FIG. 9, it is assumed that the results of LBT indicate that subbands #0 to #3 are available.

For example, at (a) in FIG. 9, the number of BDs in a PDCCH monitoring occasion valid for a terminal (e.g., SS #1 in subband #3) is 11. At (a) in FIG. 9, the number of BDs (11 times) configured for the terminal is equal to or less than the maximum number of BDs (e.g., 44 times). Therefore, at (a) in FIG. 9, depending on the SS configuration, it is possible to map another SS different from SS #1 to, for example, subband #3 for the terminal to transmit and receive a PDCCH.

Meanwhile, for example, at (b) in FIG. 9, the number of BDs in PDCCH monitoring occasions valid for a terminal (e.g., SSs #1 in subbands #0 to #3) is 44. At (b) in FIG. 9, the number of BDs (44 times) configured for the terminal is at the maximum number of BDs (e.g., 44 times). Therefore, at (b) in FIG. 9, it is impossible to further map another SS different from SS #1 for the terminal.

In NR, for example, PDCCHs of different types or different uses are associated with respective SSs, and the SSs are used according to different uses for achieving improvement in efficiency for PDCCH transmission/reception. However, for example, in the example illustrated at (b) in FIG. 9, it is not possible to map a plurality of SSs to each of the LBT subbands and it is thus likely that it is impossible to improve PDCCH mapping efficiency. As is understood, there is scope for further study on a method for PDCCH transmission in DL burst detection of NR-U. Here, one exemplary embodiment of the present disclosure will be described in relation to a method for improving efficiency for the DL burst detection and PDCCH transmission in NR-U.

Embodiment 1

[Overview of Communication System]

Figure 10:
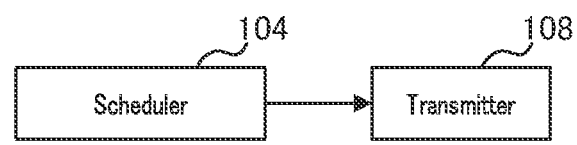
FIG. 10 is a block diagram illustrating a configuration of a part of a base station.
Figure 11:
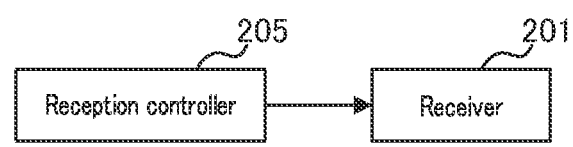
FIG. 11 is a block diagram illustrating a configuration of a part of a terminal.
Figure 12:
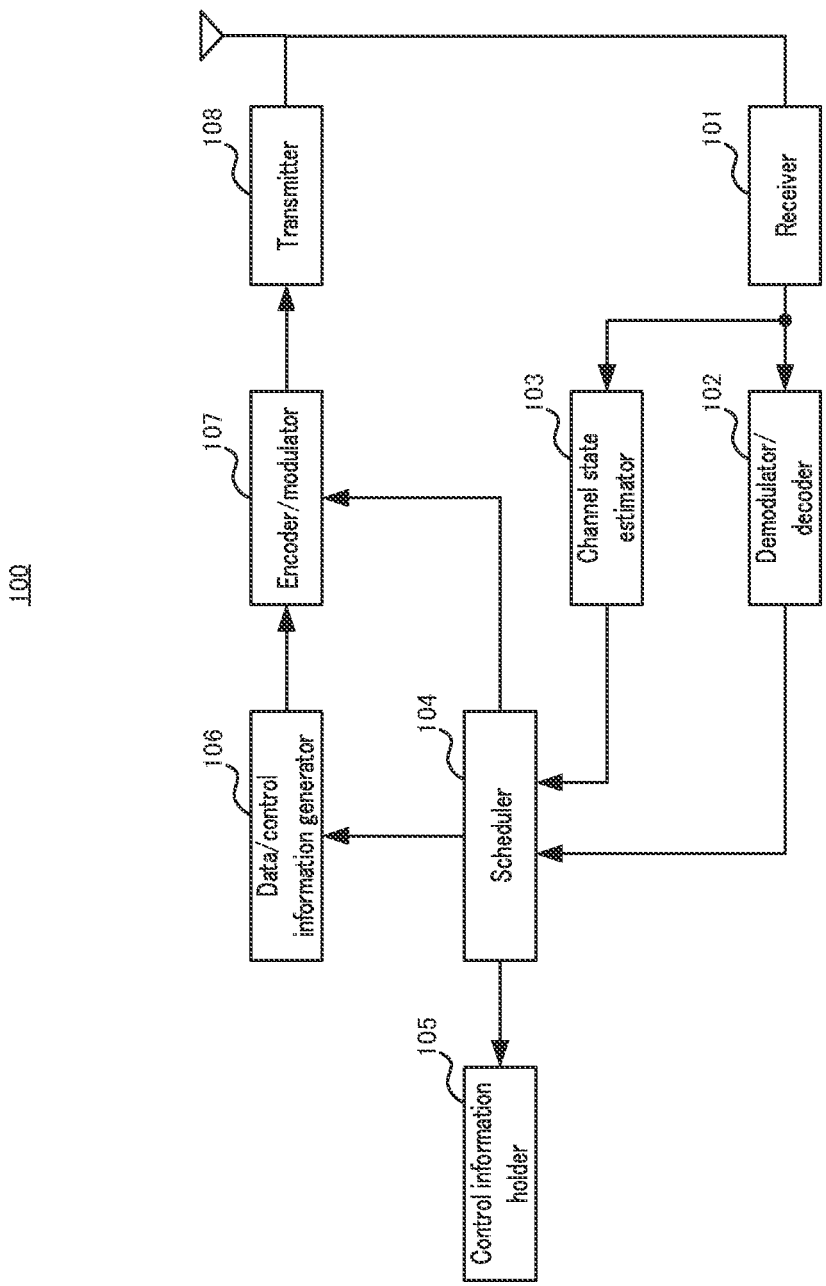
FIG. 12 is a block diagram illustrating a configuration of the base station.
Figure 13:
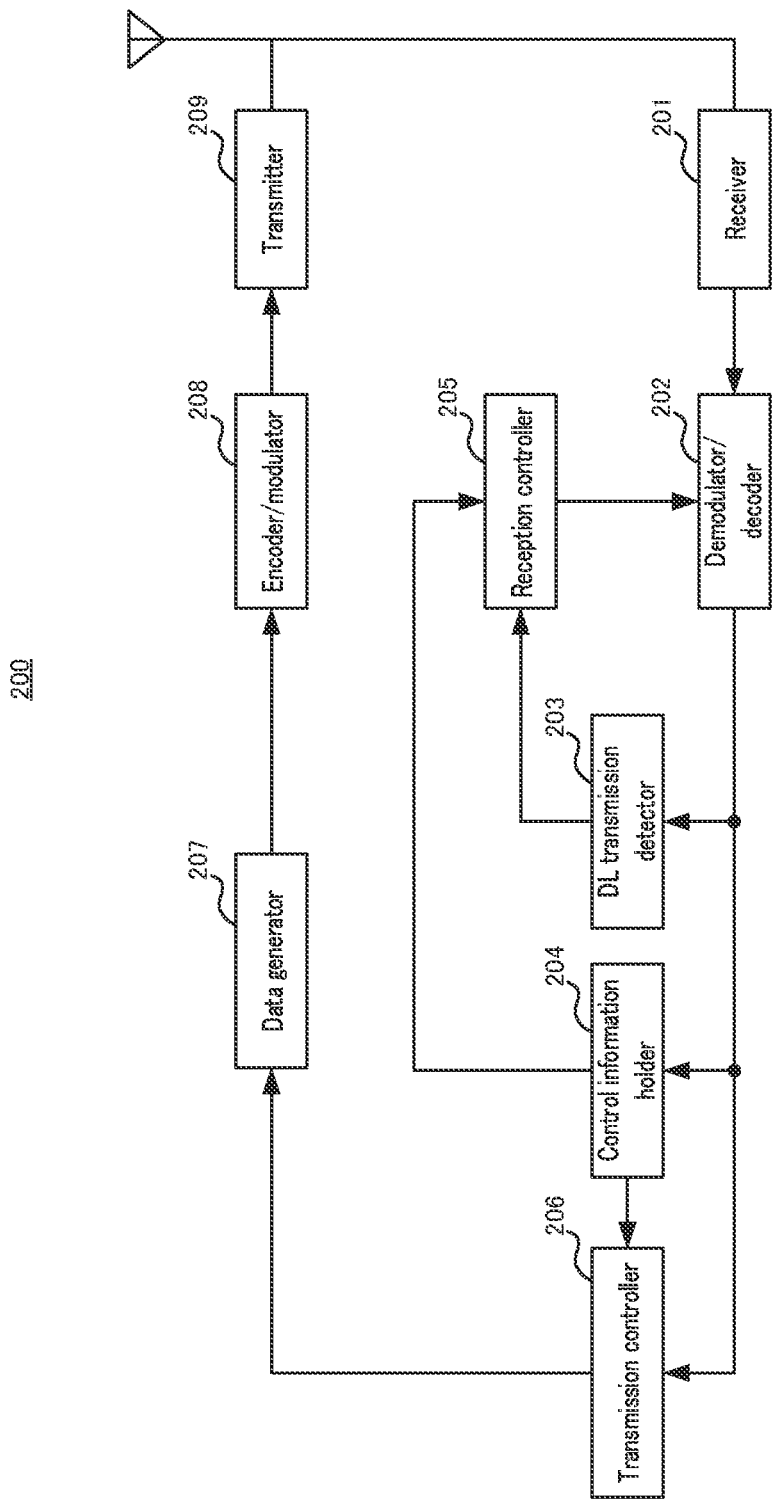
FIG. 13 is a block diagram illustrating a configuration of the terminal.

A communication system according to an aspect of the present disclosure includes, for example, base station 100 (e.g., gNB) illustrated in FIGS. 10 and 12, and terminal 200 (e.g., UE) illustrated in FIGS. 11 and 13.

FIG. 10 is a block diagram illustrating a configuration example of a part of base station 100 according to an aspect of the present disclosure. In base station 100 illustrated in FIG. 10, scheduler 104 determines, based on information on at least one of the number of BDs for a downlink control channel signal and the number of resources (e.g., the number of CCEs) for channel estimation, a mapping method for mapping the downlink control channel signal in at least one of a first period (e.g., Phase A) on or before a timing based on carrier sensing (e.g., LBT) (in other words, a timing of DL burst detection by terminal 200) and a second period (e.g., Phase B or Phase C) on or after the timing based on the carrier sensing (in other words, the scheduler determines a PDCCH monitoring occasion). Transmitter 108 transmits the downlink control channel signal based on the determined mapping method.

FIG. 11 is a block diagram illustrating a configuration example of apart of terminal 200 according to an aspect of the present disclosure. In terminal 200 illustrated in FIG. 11, reception controller 205 determines a reception occasion (e.g., PDCCH monitoring occasion) for receiving the downlink control channel signal in at least one of the first period (e.g., Phase A) on or before the detection timing of the downlink burst (the DL burst) and the second period (e.g., Phase B or Phase C) on or after the detection timing, based on the information on at least one of the maximum number of BDs for the downlink control channel signal and the number of resources (e.g., CCEs) for channel estimation. Receiver 201 receives the downlink control channel signal on the determined reception occasion.

[Configuration of Base Station]

FIG. 12 is a block diagram illustrating a configuration example of base station 100 according to an aspect of the present disclosure. In FIG. 12, base station 100 includes receiver 101, demodulator/decoder 102, channel state estimator 103, scheduler 104, control information holder 105, data/control information generator 106, encoder/modulator 107, and transmitter 108.

Receiver 101 receives, via an antenna, a signal transmitted by terminal 200, performs reception processing such as down-conversion, A/D conversion, or the like on the received signal, and outputs the received signal subjected to the reception processing to demodulator/decoder 102 and channel state estimator 103.

Demodulator/decoder 102 performs demodulation and decoding on the received signal inputted from receiver 101, and outputs the decoding result to scheduler 104.

Channel state estimator 103 estimates, based on the received signal inputted from receiver 101, the channel state (in other words, performs carrier sensing or LBT). For example, channel state estimator 103 may judges whether the channel state is busy or idle. Channel state estimator 103 outputs information indicating the judged channel state to scheduler 104.

Scheduler 104 generates, for example, information on the configuration of a PDCCH for terminal 200 (hereinafter referred to as PDCCH configuration information), and outputs the information to control information holder 105. In addition, scheduler 104 outputs signaling information including the PDCCH configuration information to data/control information generator 106.

Scheduler 104 performs scheduling (e.g., assignment) of a PDCCH to each terminal 200, for example. For example, scheduler 104 may judge (in other words, determine) the PDCCH monitoring occasion for each terminal 200 at each phase (for example, phases A, B, and C illustrated in FIG. 7) of the DL burst based on the information indicating the channel state inputted from channel state estimator 103, and schedule the PDCCH for terminal 200 based on the judgement result. Based on the scheduling result, scheduler 104 instructs data/control information generator 106 to generate data or control information. Further, scheduler 104 outputs the scheduling information including the scheduling result to encoder/modulator 107.

Further, for example, based on the decoding result inputted from demodulator/decoder 102, scheduler 104 may instruct data/control information generator 106 to generate data or control information.

For example, the PDCCH configuration information may include configuration information such as configuration of a CORESET or configuration of a SS.

Control information holder 105 holds, for example, the control information (including, for example, the PDCCH configuration information) inputted from scheduler 104. Control information holder 105 may output the held information to each constituent unit of base station 100 (for example, scheduler 104) as necessary.

Data/control information generator 106 generates data or control information in accordance with an instruction from scheduler 104, and outputs a signal including the generated data or control information to encoder/modulator 107. The control information may include, for example, signaling information inputted from scheduler 104.

Encoder/modulator 107 encodes and modulates, for example, based on the scheduling information inputted from scheduler 104, the signal inputted from data/control information generator 106, and outputs the modulated signal (symbol sequence) to transmitter 108.

Transmitter 108 performs transmission processing such as D/A conversion, up-conversion, amplification, or the like on the signal inputted from encoder/modulator 107, and transmits, from the antenna to terminal 200, a radio signal obtained by the transmission processing.

[Configuration of Terminal]

FIG. 13 is a block diagram illustrating a configuration example of terminal 200 according to an aspect of the present disclosure. In FIG. 13, terminal 200 includes receiver 201, demodulator/decoder 202, DL transmission detector 203, control information holder 204, reception controller 205, transmission controller 206, data generator 207, encoder/modulator 208, and transmitter 209.

Receiver 201 performs reception processing such as down-conversion, A/D conversion, or the like on a received signal received via an antenna, and outputs the received signal to demodulator/decoder 202.

Demodulator/decoder 202 demodulates and decodes data or control information included in the received signal inputted from receiver 201, and outputs the decoding result to transmission controller 206. For example, demodulator/decoder 202 outputs signaling information included in the decoding result to control information holder 204.

Further, for example, based on information inputted from reception controller 205, demodulator/decoder 202 demodulates and decodes a PDCCH included in the received signal, and outputs the decoding result of decoding of the PDCCH to DL transmission detector 203.

DL transmission detector 203 detects the DL burst based on the decoding result of decoding of the PDCCH inputted from demodulator/decoder 202. DL transmission detector 203 outputs the DL burst information indicating a DL burst detection result to reception controller 205. The DL burst information may include, for example, LBT information indicating a resource (e.g., LBT subband) available to terminal 200 or information such as a channel occupancy time (COT) duration.

Control information holder 204 holds the signaling information (e.g., PDCCH configuration information) inputted from demodulator/decoder 202, and outputs the held signaling information to each constituent unit (e.g., reception controller 205 or transmission controller 206) as necessary.

Reception controller 205 judges the PDCCH monitoring occasion based on the DL burst information inputted from the DL transmission detector 203 and the PDCCH configuration information inputted from control information holder 204. Reception controller 205 outputs the PDCCH monitoring occasion indicating the judgement result to demodulator/decoder 202.

Based on the decoding result inputted from demodulator/decoder 202 and the information inputted from control information holder 204, transmission controller 206 instructs data generator 207 to generate data.

Data generator 207 generates transmission data (e.g., PUSCH) based on the data generation instruction inputted from transmission controller 206, and outputs the transmission data (e.g., PUSCH) to encoder/modulator 208.

Encoder/modulator 208 encodes and modulates the transmission data inputted from data generator 207, and outputs the modulated signal to transmitter 209.

Transmitter 209 performs transmission processing such as D/A conversion, up-conversion, amplification, or the like on the signal inputted from encoder/modulator 208, and transmits, from the antenna to base station 100, a radio signal obtained by the transmission processing.

[Operation of Base Station 100 and Terminal 200]

An operation example of base station 100 and terminal 200 having the above configurations will be described.

Figure 14:
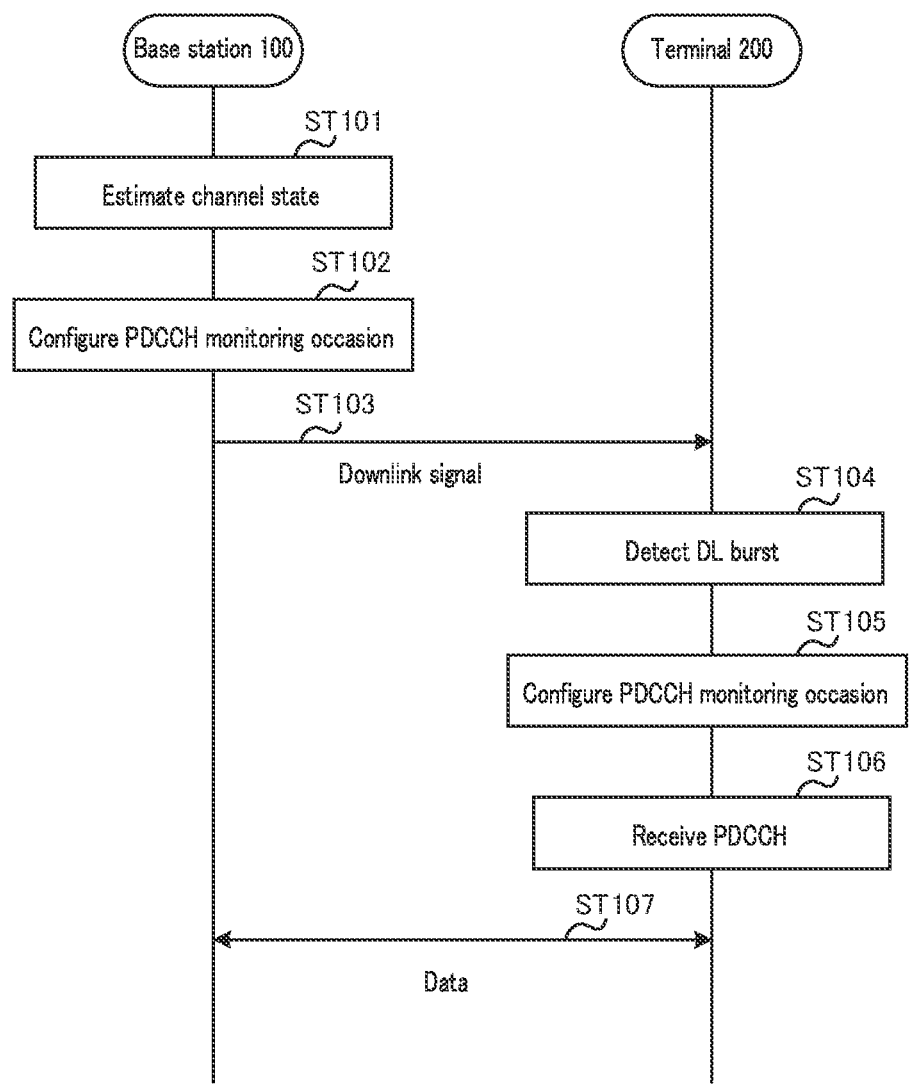
FIG. 14 is a sequence diagram illustrating an exemplary operation of the base station and the terminal.

FIG. 14 is a sequence diagram illustrating an operation example of base station 100 and terminal 200.

Base station 100 performs, for example, channel state estimation (e.g., carrier sensing or LBT) (ST101).

Base station 100 configures a PDCCH monitoring occasion for terminal 200 (ST102). For example, base station 100 may configure the PDCCH monitoring occasion for terminal 200 based on the result of channel state estimation (e.g., busy state or idle state), information on a LBT subband configured for terminal 200, or information on the number of BDs or CCEs configured for terminal 200.

Base station 100 transmits a downlink signal to terminal 200 (ST103). The downlink signal may include, for example, the DL burst information, PDCCH configuration information, or a PDCCH signal including, for example, scheduling information. These pieces of information may be included in the same signal or in different signals. For example, the DL burst information may be included in a group common PDCCH (GC-PDCCH). Further, the PDCCH configuration information may be included in the signaling information.

Terminal 200 detects the DL burst (ST104) based on, for example, the signal (e.g., GC-PDCCH) transmitted by base station 100.

Terminal 200 configures the PDCCH monitoring occasion for terminal 200 (ST105). For example, terminal 200 may configure the PDCCH monitoring occasion for terminal 200 based on a DL burst detection result, information on the LBT subband configured for terminal 200, or information such as the number of BDs or the number of CCEs configured for terminal 200.

For example, terminal 200 receives (e.g., performs blind decoding of) the PDCCH addressed to terminal 200 on the configured PDCCH monitoring occasion (ST106). The PDCCH may include, for example, information on resources scheduled (in other words, assigned) for terminal 200.

Base station 100 and terminal 200 communicate data (e.g., uplink data or downlink data) based on the resources assigned for terminal 200 (ST107).

[PDCCH Monitoring Occasion Determination Method]

One example of a determination method for scheduler 104 of base station 100 to determine the PDCCH monitoring occasion will be described. Further, reception controller 205 of terminal 200 may judge the PDCCH monitoring occasion based on the same determination method as that for scheduler 104.

Determination Method 1

In determination method 1, when the number of BDs or the number of CCEs to be configured for terminal 200 exceeds a threshold (e.g., an upper limit value such as a maximum number of BDs or a maximum number of CCEs), base station 100 determines a search space (SS) to be mapped to resources based on LBT subband priorities. For example, base station 100 may drop an SS based on a priority for each LBT subband. In other words, by dropping an SS on a basis of LBT subband, base station 100 configures the number of BDs or the number of CCEs to be configured for terminal 200 such that the number is equal to or smaller than the threshold.

The dropping rule for dropping an SS on a basis of LBT subband may be applied, for example, in addition to a dropping rule defined in Release 15 NR.

For example, in the dropping rule according to determination method 1, dropping of SSs is first performed in descending order of SS IDs. In other words, in the dropping rule, the SSs are mapped to the resources in ascending order of SS IDs.

Next, for example, when there are a plurality of SSs of the same SS ID, base station 100 performs dropping of the SSs based on the LBT subband priorities when the numbers of BDs or CCEs of the SSs exceed the threshold (e.g., the maximum number of BDs or the maximum number of CCEs). For example, base station 100 may drop the SSs in ascending order of the LBT subband priorities. In other words, base station 100 may map the SSs to resources in descending order of the LBT subband priorities.

Figure 15:
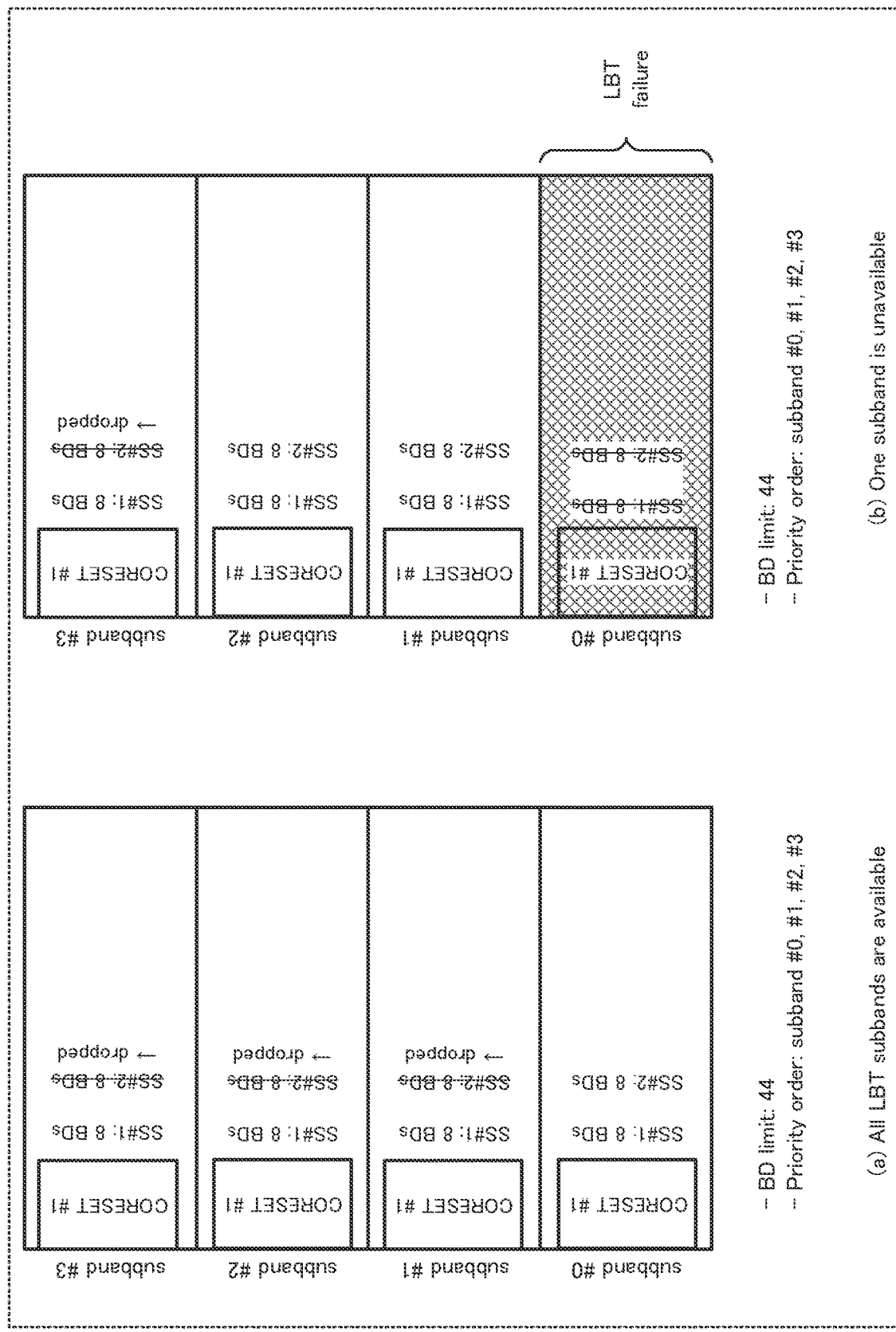
FIG. 15 illustrates an exemplary PDCCH monitoring occasion configuration according to determination method 1 of Embodiment 1.

FIG. 15 illustrates an operation example according to determination method 1.

Note that, the number of BDs is considered but the number of CCEs is not considered in FIG. 15 for simplification of the description. For example, base station 100 may determine SSs based on the dropping rule according to determination method 1 not only when the number of BDs configured for terminal 200 exceeds the maximum number of BDs but also when at least one of the number of BDs and the number of CCEs exceeds the threshold (e.g., either the maximum number of BDs or the maximum number of CCEs).

In the example illustrated in FIG. 15, the maximum number of BDs configured for terminal 200 is 44.

Further, in FIG. 15, four LBT subbands (e.g., LBT subbands #0 to #3) are described as an example, but the number of LBT subbands is not limited to four but another number of LBT subbands may be used. Further, in FIG. 15, the LBT subband priorities are in the order of subbands #0, #1, #2, #3 for both SS #1 and SS #2 (in other words, the priority of subband #0 is the highest and the priority of subband #3 is the lowest). Further, in FIG. 15, for example, among the SSs (for example, SS #1 and SS #2) configured for each of the subbands, the ID of SS #1 is lower than that of SS #2, and thus, SS #1 is mapped to resources in preference to SS #2.

Further, the number of BDs in each of the SSs mapped respectively to the subbands is 8. However, the number of BDs in the SS is not limited to 8, and other numbers may be used.

For example, part (a) in FIG. 15 illustrates a state in which four LBT subbands of subbands #0 to #3 are found to be available to terminal 200 as a result of the LBT.

For example, with respect to SS #1 having a higher priority than SS #2 at (a) in FIG. 15, when SS #1 is mapped to each of LBT subbands #0 to #3, the number of BDs configured for terminal 200 is 32, which is equal to or less than the maximum number of BDs (44). Thus, SS #1 is mapped to the resources of each of the available LBT subbands #0 to #3 (in other words, no SS #1 is dropped).

Further, with respect to SS #2 having a lower priority than SS #1 at (a) in FIG. 15, when SS #2 in addition to SS #1 is mapped to each of LBT subbands #0 to #3, the number of BDs configured for terminal 200 is 64, which exceeds the maximum number of BDs (44). Therefore, base station 100 maps SS #2 to resources in subband #0 and drops SS #2 for subbands #1, #2, and #3 based on the priorities of subbands #0 to #3, for example. With such dropping, the number of BDs configured for terminal 200 is 40, which is equal to or less than the maximum number of BDs (44).

On the other hand, part (b) in FIG. 15 illustrates a situation in which three LBT subbands of subband #1 to #3 are found to be available to terminal 200 as a result of the LBT, and subband #0 is not available due to an LBT failure.

At part (b) in FIG. 15, base station 100 can count the number of BDs, for example, while excluding, from the number of BDs for terminal 200, the number of BDs (for example, 16 times) in the SS configured for unavailable subband #0.

For example, with respect to SS #1 having a higher priority than SS #2 at (b) in FIG. 15, when SS #1 is mapped to each of LBT subbands #1 to #3, the number of BDs configured for terminal 200 is 24, which is equal to or less than the maximum number of BDs (44). Thus, SS #1 is mapped to the resources of each of the available LBT subbands #1 to #3 (in other words, no SS #1 is dropped).

Further, with respect to SS #2 having a lower priority than SS #1 at (b) in FIG. 15, when SS #2 in addition to SS #1 is mapped to each of LBT subbands #1 to #3, the number of BDs configured for terminal 200 is 48, which exceeds the maximum number of BDs (44). Therefore, base station 100 maps SS #2 to resources in subbands #1 and #2 and drops SS #2 for subband #3 based on the priorities of subbands #1 to #3, for example. With such dropping, the number of BDs configured for terminal 200 is 40, which is equal to or less than the maximum number of BDs (44).

Here, if the dropping rule according to determination method 1 is not applied (for example, in the case of the dropping rule defined in Release 15 NR), SS #1 is mapped to the resources and SS #2 is dropped for each of the LBT subbands in both of the cases of (a) and (b) in FIG. 15. In other words, the same SS (e.g., SS #2) configured for a plurality of LBT subbands is not mapped to the resources of any of the plurality of LBT subbands.

Unlike this, according to determination method 1, SS #2 is mapped to the resources of subband #0 at (a) in FIG. 15, and is mapped to the resources of subbands #1 and #2 at (b) in FIG. 15. In other words, in determination method 1, it is determined based on the priorities of a plurality of LBT subbands whether the same SS (e.g., SS #2) configured for a plurality of LBT subbands is mapped or dropped in the resources. For example, as illustrated at (a) and (b) in FIG. 15, SS #2 configured for the LBT subbands may be mapped to the resources in some of the LBT subbands, and may be dropped in the remaining LBT subbands. With this dropping rule, base station 100 can increase the number of SSs to be configured for terminal 200, thereby improving the transmission and reception efficiencies for transmission and reception of the PDCCH.

For example, the dropping rule according to determination method 1 may be applied to all the LBT subbands (the same as at (a) in FIG. 15, for example) when applied in Phase A illustrated in FIG. 7. In addition, when applied in Phase B and Phase C illustrated in FIG. 7, the dropping rule according to determination method 1 may be applied to all the LBT subbands (the same as at (a) in FIG. 15, for example), or may be applied to a LBT subband available to terminal 200 based on the LBT result (as at (b) in FIG. 15, for example).

When the dropping rule according to determination method 1 is applied to all the LBT subbands (e.g., w % ben applied in Phase A), mapping of the SS does not change depending on the result of the LBT. It is thus possible to simplify the SS judgement processing or the PDCCH scheduling in base station 100, or the reception operation in terminal 200.

In addition, when the dropping rule according to determination method 1 is applied to LBT subbands available to terminal 200 (e.g., Phase B or C), an unavailable LBT subband can, for example, be excluded from the count of the number of BDs in accordance with the determination by LBT, and it is thus possible to increase the number of actually mapped PDCCH candidates to improve the resource utilization efficiency.

Also, in determination method 1, the LBT subband priorities may be indicated by base station 100 to terminal 200 using signaling information, or may be defined in specifications (standards). For example, a higher LBT subband priority may be configured for an LBT subband with a smaller subband number, or a random priority may be configured for each terminal 200.

The LBT subband priorities may also differ from SS to SS. The use of different LBT subband priorities being different between SSs, for example, makes it more likely for SSs to be mapped to different LBT subbands, thus reducing the probability of collision (in other words, blocking) of PDCCH resources (PDCCH monitoring occasions) between the SSs.

The LBT subband priorities may also be different between terminals 200. The use of different LBT subband priorities being different between terminals 200, for example, makes it more likely that LBT subbands in which PDCCHs are mapped are different between terminals 200, thus reducing the possibility of collision (in other words, blocking) of PDCCH monitoring occasions between terminals 200.

Further, although the description with reference to FIG. 15 has been given in relation to the case where the SS is configured for each of the LBT subbands, the SS does not have to be configured for each of the LBT subbands configured for terminal 200, but may also be configured for some of the LBT subbands. Also in this case, base station 100 may judge dropping based on the priorities of those some LBT subbands.

As is understood, according to determination method 1, application of the dropping rule based on LBT subband priorities can increase the number of SSs (in other words, PDCCH monitoring occasions) that can be mapped in LBT subbands, improving the resource utilization efficiency.

Variation of Determination Method 1

Note that, determination method 1 has been described in relation to, for example, the method in which the LBT subband priorities are judged after judgment of SS IDs. In other words, the description has been given of the method in which when there are a plurality of SSs with the same SS ID, and when the number of BDs or CCEs exceeds a threshold (e.g., the maximum number of BDs or the maximum number of CCEs). SSs are dropped in ascending order of priority based on the LBT subband priorities. However, the present disclosure is not limited to this method.

For example, in a variation of determination method, a method in which the order of the judgement of SS IDs and the judgement of the LBT subband priorities in the above method is reversed may be applied. In other words, for example, a method may be adopted in which the judgement of SS IDs is performed after the judgement of the LBT subband priorities. For example, base station 100 may first drop SSs in ascending order of LBT subband priorities, and may drop SSs in descending order of SS IDs when there are a plurality of SSs in the same LBT subband.

Figure 16:
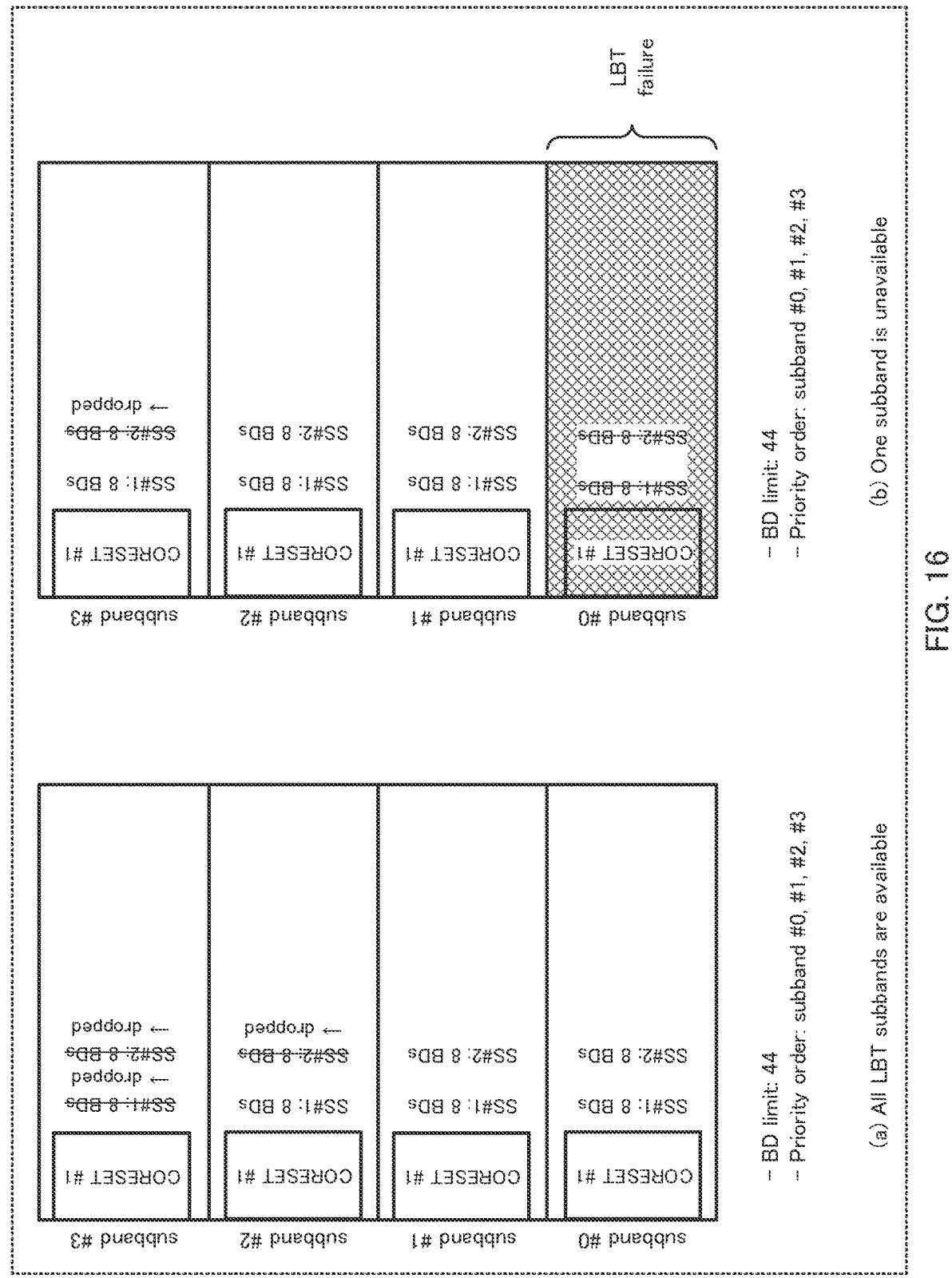
FIG. 16 illustrates an exemplary PDCCH monitoring occasion configuration according to a variation of determination method 1 of Embodiment 1.

FIG. 16 illustrates an operation example according to the variation of determination method 1. Note that, the conditions illustrated in FIG. 16 (for example, contents such as the maximum number of BDs, the number of BDs for each SS, the number of LBT subbands, the LBT subband priorities, or the LBT results) are the same as those in the example illustrated in FIG. 15.

At (a) in FIG. 16, base station 100 first maps SSs to resources in LBT subbands in descending order of LBT subband priorities (for example, in the order of subbands #0, #1, #2, #3). At (a) in FIG. 16, for example, when both SS #1 and SS #2 are mapped to subband #2, the number of BDs configured for terminal 200 is 48, which exceeds the maximum number of BDs (44). Therefore, in subband #2, base station 100 maps SS #1 with a lower SS ID (SS having a higher priority) to the resources, and drops SS #2 with a higher SS ID. With such dropping, the number of BDs configured for terminal 200 is 40, which is equal to or less than the maximum number of BDs (44). Note that, at (a) in FIG. 16, both SS #1 and SS #2 in subband #3 with a lower priority are dropped.

Also in the case of (b) in FIG. 16, the SSs are mapped to the resources of each of the LBT subbands in the same manner as in the case of (a) in FIG. 16. In the case of (b) in FIG. 16, SS #2 in subband #3 is dropped.

As is understood, such a method as that in the variation of determination method 1 in which the order of the judgement of SS IDs and the judgement of the LBT subband priorities is changed from that of determination method 1 also can increase the number of SSs (in other words, PDCCH monitoring occasions) that can be mapped to the LBT subbands, thus improving the resource utilization efficiency. Further, in the variation of determination method 1, this dropping rule enables scheduling to concentrate PDCCH monitoring occasions in a part of the LBT subbands as compared with, for example, determination method 1.

The variation of determination method 1 has been described above.

Note that, the present disclosure is not limited to dropping on a SS-by-SS basis, but dropping may be performed on a basis of PDCCH candidate. For example, Aggregation levels (ALs) may be provided with priorities, and the SSs may be mapped in descending order of AL priorities until the maximum number of BDs or the maximum number of CCEs is reached. This SS mapping makes it possible to allocate PDCCH candidates with finer granularity. It is thus possible to increase PDCCH monitoring occasions to improve the resource utilization efficiency.

In addition, dropping on a basis of PDCCH candidate may be applied, for example, in conjunction with the LBT subband priorities. For example, when the above-described dropping rule according to determination method 1 is applied, dropping on a basis of PDCCH candidate may be performed instead of dropping on a basis of SS. Alternatively, the LBT subband priorities do not have to be applied and dropping on a basis of PDCCH candidate may be applied to all LBT subbands. In the case where dropping on a basis of PDCCH candidate is applied to all LBT subbands, and when there are a plurality of SSs with the same SS ID, base station 100 may map the SSs, for example, based on judgement of SS IDs and then perform SS dropping based on the AL priorities for all the LBT subbands. This dropping makes it possible, for example, to schedule PDCCH candidates and PDCCH monitoring occasions in a distributed manner across the LBT subbands, so as to reduce the probability of collision of the PDCCH monitoring occasions.

Determination Method 2

In determination method 2, when LBT subbands for which PDCCH monitoring occasions are configured is larger in number than a threshold (e.g., the maximum number of LBT subbands), base station 100 determines, based on LBT subband priorities, SSs to be mapped to resources. For example, base station 100 may drop an SS based on a priority for each LBT subband.

Dropping the SS on a basis of LBT subband based on the number of LBT subbands may be applied, for example, prior to application of the dropping rule defined in Release 15 NR.

For example, in the dropping according to determination method 2, when the number of LBT subbands configured for terminal 200 exceeds the threshold (e.g., the maximum number of LBT subbands), base station 100 may drop SSs based on the LBT subband priorities. For example, base station 100 may drop SSs configured for the LBT subbands in ascending order of LBT subband priorities. In other words, base station 100 may map, to the resources, the SSs configured for the LBT subbands in descending order of the LBT subband priorities.

After dropping based on the number of LBT subbands according to determination method 2, base station 100 may drop the SSs in descending order of SS IDs as in Release 15 NR, for example, w % ben the numbers of BDs or CCEs for the SSs exceed a threshold (e.g., the maximum number of BDs or the maximum number of CCEs).

Figure 17:
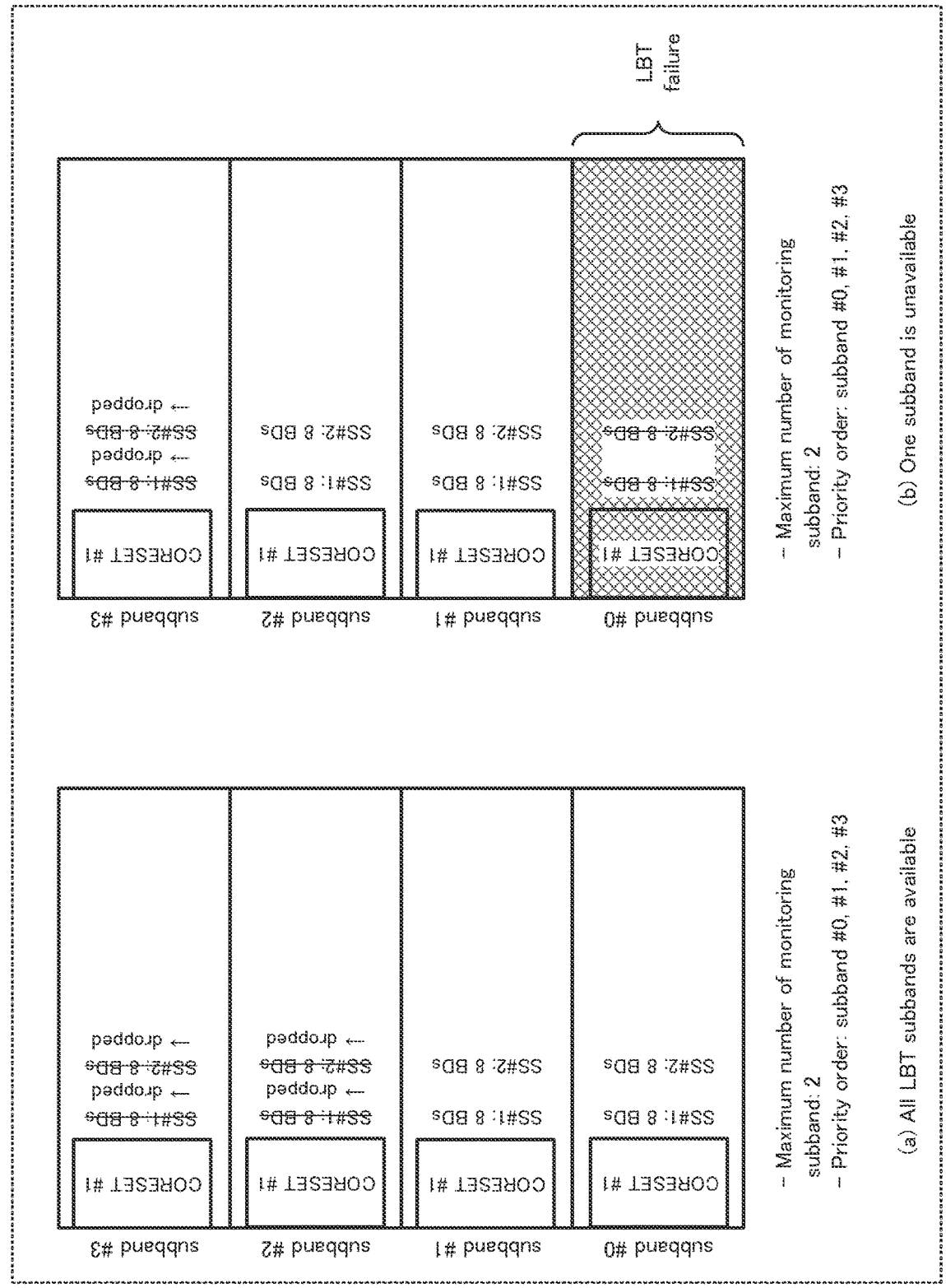
FIG. 17 illustrates an exemplary PDCCH monitoring occasion configuration according to determination method 2 of Embodiment 1.

FIG. 17 illustrates an operation example according to determination method 2.

Note that, the number of BDs is considered but the number of CCEs is not considered in FIG. 17 for simplification of the description. For example, base station 100 may determine SSs based on the dropping rule according to determination method 2 not only when the number of BDs configured for terminal 200 exceeds the maximum number of BDs but also when at least one of the number of BDs and the number of CCEs exceeds the threshold (e.g., either the maximum number of BDs or the maximum number of CCEs).

In FIG. 17, four LBT subbands (e.g., LBT subbands #0 to #3) are described as an example, but the number of LBT subbands is not limited to four and another number of LBT subbands may also be used. Further, in FIG. 17, the LBT subband priorities are in the order of subbands #0, #1, #2, #3 for both SS #1 and SS #2 (in other words, the priority of subband #0 is the highest and the priority of subband #3 is the lowest).

In addition, in the example illustrated in FIG. 17, the maximum number of LBT subbands configured for terminal 200 is two for both SS #1 and SS #2.

Further, the number of BDs in the SS mapped to each subband is 8. However, the number of BDs in the SS is not limited to 8, and other numbers may be used.

For example, part (a) in FIG. 17 illustrates a state in which four LBT subbands of subbands #0 to #3 are found to be available to terminal 200 as a result of the LBT.

At (a) in FIG. 17, for both SS #1 and SS #2, the configured number of LBT subbands exceeds the maximum number of LBT subbands (2). Therefore, base station 100 maps SS #1 and SS #2 to resources in subbands #0 and #1 and drops SS #1 and SS #2 for subbands #2 and #3 based on the priorities of subbands #0 to #3, for example. With such dropping, the number of BDs configured for terminal 200 is 32, which is equal to or less than the maximum number of BDs (44).

On the other hand, part (b) in FIG. 17 illustrates a situation in which three LBT subbands of subband #1 to #3 are found to be available to terminal 200 as a result of the LBT, and subband #0 is not available due to an LBT failure.

At (b) in FIG. 17, for both SS #1 and SS #2, the configured number of LBT subbands exceeds the maximum number of LBT subbands (2). Therefore, base station 100 maps SS #1 and SS #2 to resources in subbands #1 and #2 and drops SS #1 and SS #2 for subband #3 based on the priorities of subbands #1 to #3, for example. With such dropping, the number of BDs configured for terminal 200 is 32, which is equal to or less than the maximum number of BDs (44).

Further, at both (a) and (b) in FIG. 17, base station 100 may apply the dropping rule in e.g., Release 15 NR (e.g., dropping based on the number of BDs or the number of CCEs) after dropping of the SS based on the maximum number of LBT subbands.

For example, the dropping rule according to determination method 2 may be applied to all the LBT subbands (the same as at (a) in FIG. 17, for example) when applied in Phase A illustrated in FIG. 7. In addition, when applied in Phase B and Phase C illustrated in FIG. 7, the dropping rule according to determination method 2 may be applied to all the LBT subbands (the same as at (a) in FIG. 17, for example), or may be applied to a LBT subband available to terminal 200 (the same as at (b) in FIG. 17, for example).

When the dropping rule according to determination method 2 is applied to all the LBT subbands (e.g., w % ben applied in Phase A), mapping of the SS does not change depending on the result of the LBT. It is thus possible to simplify the SS judgement processing or the PDCCH scheduling in base station 100, or the reception operation in terminal 200.

In addition, when the dropping rule according to determination method 2 is applied to an LBT subband available to terminal 200 (e.g., Phase B or C), an unavailable LBT subband can, for example, be excluded in accordance with the determination of the LBT, and it is thus possible to increase the number of actually mapped PDCCH candidates to improve the resource utilization efficiency.

Also, in determination method 2, at least one of the maximum number of LBT subbands and the LBT subband priorities may be indicated by base station 100 to terminal 200 using signaling information, or may be defined in specifications (standards). For example, a higher LBT subband priority may be configured for an LBT subband with a smaller subband number, or a random priority may be configured for each terminal 200.

At least one of the maximum number of LBT subbands and the LBT subband priorities may also differ from SS to SS. The use of the maximum number of LBT subbands and the LBT subband priorities being different between SSs, for example, makes it more likely for SSs to be mapped to different LBT subbands, thus reducing the probability of collision (in other words, blocking) of PDCCH resources (PDCCH monitoring occasions) between the SSs.

At least one of the maximum number of LBT subbands and the LBT subband priorities may also be different between terminals 200. The use of the maximum number of LBT subbands and the LBT subband priorities being different between terminals 200, for example, makes it more likely that LBT subbands in which PDCCHs are mapped are different between terminals 200, thus reducing the possibility of collision (in other words, blocking) of PDCCH monitoring occasions between terminals 200.

In addition, the dropping rule according to determination method 2 may be applied to a CSS, unlike, for example, the dropping rule in Release 15 NR (e.g., the dropping rule based on the maximum number of BDs or the maximum number of CCEs). In the dropping rule of Release 15 NR, it is determined whether or not an SS is dropped, for example, depending on the number of BDs or the number of CCEs for each UE. The count of the number of BDs or the number of CCEs is, for example, the total of a CSS and a USS. Accordingly, for example, in the case of a dropping rule of dropping SSs including the CSS, whether or not the CSS is dropped may differ for each UE.

Here, it is assumed that the CSS is shared and used among UEs. If whether or not the CSS is dropped differs for each UE, a situation may occur in which a PDCCH transmitted in the CSS can be received by one UE while not received by another UE. In this situation, scheduling by base station 100 is assumed to become complicated. Thus, for example, it is difficult to assume application of the dropping rule of Release 15 NR to the CSS.

On the other hand, since base station 100 indicates terminal 200 of an LBT subband available to terminal 200 at the time of the DL burst transmission, the dropping rule according to determination method 2 can judge mapping of SSs (in other words, dropping of the SSs), for example, based on the number of LBT subbands available to terminal 200. Thus, in determination method 2, it is possible, for example, to judge dropping of SSs (e.g., CSS) based on the same judgement criterion between terminals 200 by using the same configuration of the maximum number of LBT subbands and the LBT subband priorities between terminals 200. Therefore, the dropping rule according to determination method 2 can also be applied to the CSS.

Further, although the description with reference to FIG. 17 has been given in relation to the case where the SS is configured for each of the LBT subbands, the SS does not have to be configured for each of the LBT subbands configured for terminal 200, but may also be configured for some of the LBT subbands. Also in this case, base station 100 may judge dropping based on the number and priorities of those some LBT subbands.

As is understood, according to determination method 2, application of the dropping rule based on the number and priorities of the LBT subbands can increase the number of SSs (in other words, PDCCH monitoring occasions) that can be mapped in LBT subbands, improving the resource utilization efficiency.

Determination method 1 and determination method 2 have been described above.

In the present embodiment, base station 100 and terminal 200 determine the configuration of the PDCCH monitoring occasion (in other words, the mapping method for base station 100 to map a PDCCH) in each LBT subband based on the priorities of the LBT subbands (frequency resources) configured for terminal 200. This configuration makes it possible for base station 100 and terminal 200 to configure the PDCCH monitoring occasion (e.g., parameters such as SSs. or the number of BDs and the number of CCEs) for each of a plurality of LBT subbands, so as to improve the PDCCH allocation efficiency.

In addition, in the present embodiment, base station 100 and terminal 200 determine the PDCCH monitoring occasion (in other words, PDCCH mapping method) in at least one of Phase A (the period on or before the DL burst detection timing), and, Phase B and Phase C (the period on or after the DL burst detection timing) based on, for example, the information on at least one of the maximum number of BDs and the maximum number of CCEs. For example, base station 100 and terminal 200 determine, depending on the Phases of the DL burst detection, LBT subbands for which PDCCH monitoring occasions are to be configured, and determine the configuration of the PDCCH monitoring occasions for the determined LBT subbands. This configuration makes it possible for base station 100 and terminal 200 to configure the PDCCH monitoring occasions suitable for each Phase of the DL burst detection, so as to improve the PDCCH mapping efficiency.

Therefore, according to the present embodiment, for example, it is possible to improve the transmission efficiency for transmission of a DL signal in NR-U.

Embodiment 2

It is assumed that desired PDCCH monitoring occasion mapping is different between Phases related to the DL burst detection (e.g., Phases A, B and C illustrated in FIG. 7).

For example, since Phase A is the period prior to the DL burst detection, the availability of whether or not each LBT subband is available depends on an LBT result. Thus, in Phase A, a PDCCH monitoring occasion may be mapped to all the LBT subbands. Further, it is desirable that the granularity of PDCCH monitoring occasions in the time domain be finer (in other words, the PDCCH monitoring occasions be mapped at a shorter periodicity) in order to initiate transmissions earlier in Phase A.

Meanwhile, for example, since Phase C is the period after the DL burst detection, the PDCCH monitoring occasions do not have to be mapped to all the LBT subbands. In addition, in Phase C, the granularity of PDCCH monitoring occasions in the time domain may be coarse when a PDSCH does not need to be scheduled at a short periodicity.

Further, dynamically switching PDCCH monitoring occasions could complicate the scheduling processing of the base station or the reception processing of the terminal.

Here, the present embodiment will be described in relation to a method of dynamically switching PDCCH monitoring occasions while preventing the scheduling processing of the base station and the reception processing of the terminal from being complicated.

[Configurations of Base Station and Terminal]

The configurations of the base station and the terminal according to the present embodiment may be the same as the configurations of base station 100 and terminal 200 according to Embodiment 1.

Scheduler 104 of base station 100 according to the present embodiment judges a PDCCH monitoring stage based on, for example, the Phase of the DL burst detection. In addition, based on the judged PDCCH monitoring stage, scheduler 104 changes a determination method (hereinafter, also referred to as "PDCCH monitoring occasion determination method") for determining a PDCCH monitoring occasion for an LBT subband. Then, scheduler 104 determines a PDCCH monitoring occasion (e.g., SS) for each LBT subband based on, for example, the PDCCH monitoring occasion determination method.

The "PDCCH monitoring stage" is, for example, a period into which the Phases of the DL burst detection are classified based on the PDCCH monitoring occasion determination method. For example, regarding Phases A, B and C illustrated in FIG. 7, Phases A and B may be classified as "PDCCH monitoring stage 1" and Phase C may be classified as "PDCCH monitoring stage 2." For example, the PDCCH monitoring stages may be in units of slot (slots #0 and #1, respectively, in FIG. 7).

Like scheduler 104, reception controller 205 of terminal 200 according to the present embodiment judges the PDCCH monitoring stage based on the Phase of the DL burst detection, and changes the PDCCH monitoring occasion determination method for determining the PDCCH monitoring occasions for the LBT subbands based on the judged PDCCH monitoring stage.

[PDCCH Monitoring Occasion Determination Method]

An exemplary method for scheduler 104 of base station 100 to determine the PDCCH monitoring occasions will be described. Further, reception controller 205 of terminal 200 may determine the PDCCH monitoring occasions based on the same determination method as that for scheduler 104.

In the following, by way of example, base station 100 classifies Phases into two PDCCH monitoring stages from the viewpoint of PDCCH monitoring occasion switching as described above. For example, base station 100 classifies Phase A and Phase B into PDCCH monitoring stage 1 (hereinafter also referred to as "Stage 1") and classifies Phase C into PDCCH monitoring stage 2 (hereinafter also referred to as "Stage 2"). In other words, Phase A. and, Phase B included in the same slot as Phase A are classified into Stage 1, and Phase C included in a slot different from the slot of Phase A is classified into Stage 2. Note that "classifying" may be replaced with "relating" or "associating."

Figure 18:
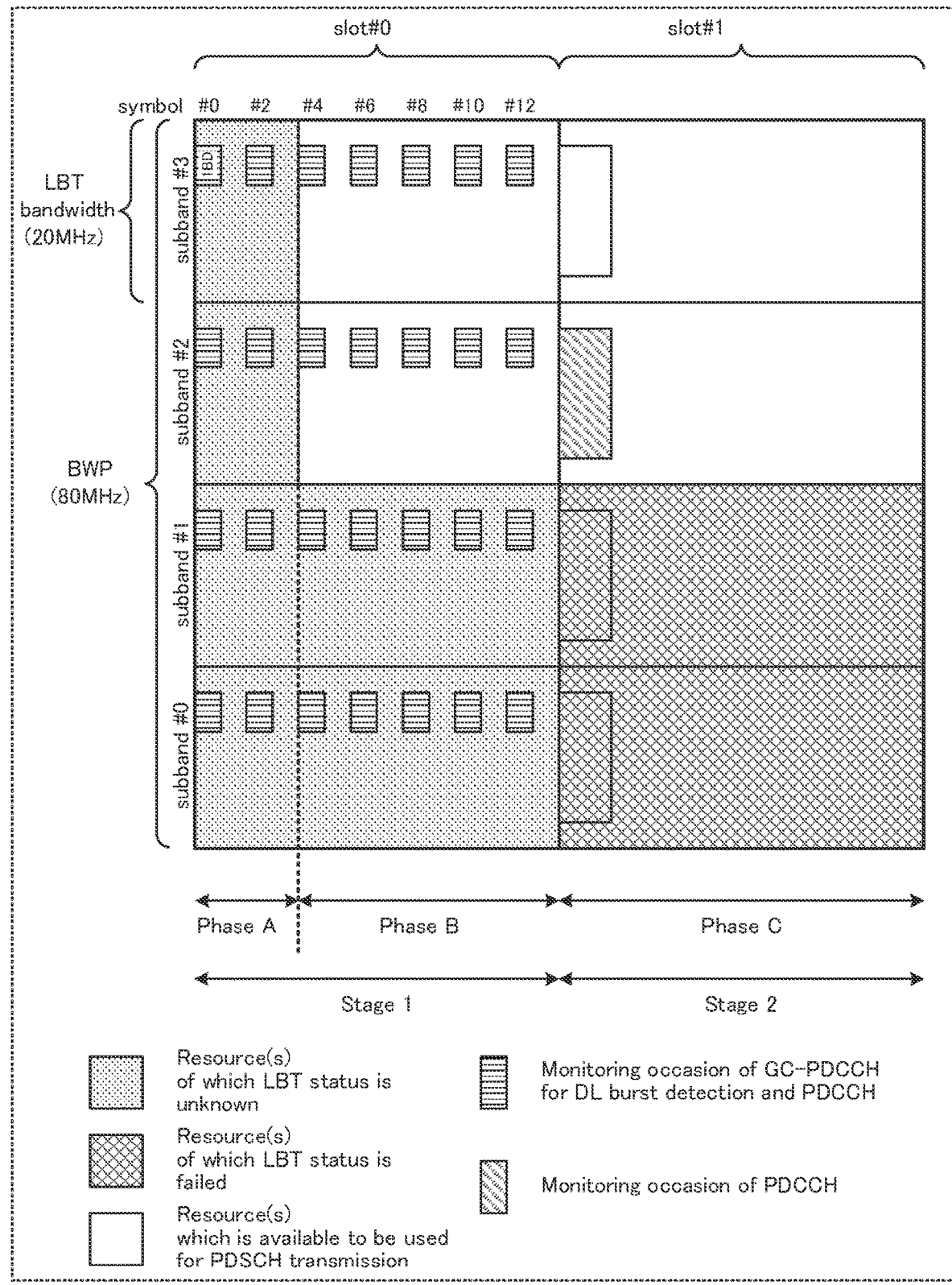
FIG. 18 illustrates an exemplary PDCCH monitoring occasion configuration according to Embodiment 2.

FIG. 18 illustrates an exemplary configuration of the PDCCH monitoring occasions according to the present embodiment.

In FIG. 18, by way of example, four LBT subbands (e.g., subbands #0, #1, #2, and #3) are configured.

In addition, by way of example, FIG. 18 illustrates an example in which terminal 200 detects the DL burst transmitted in subbands #3 and #4 at symbol #4 of slot #0. Therefore, in FIG. 18, the period of symbols #0 to #3 of slot #0 corresponds to Phase A, the period of symbols #4 to symbol #13 of slot #0 corresponds to Phase B, and the period on or after slot #1 (e.g., the period of symbols #0 to #13 of slot #1) corresponds to Phase C. In addition, in FIG. 18, as described above, Phase A and Phase B (e.g., slot #0) are classified into Stage 1, and Phase C (e.g., slot #1) is classified into Stage 2

Note that, in the example of FIG. 18, it is assumed that, in the period after symbol #4 of slot #0 (e.g., by the end of Phase B), no other available LBT subband is added besides subbands #2 and #3.

In Stage 1, base station 100 allocates the PDCCH monitoring occasions, for example, when the PDCCH monitoring occasions are configured for the LBT subbands (e.g., subbands #0 to #3 in FIG. 18) in which the DL burst can be transmitted.

Meanwhile, in Stage 2, for example, base station 100 allocates the PDCCH monitoring occasions for those of the LBT subbands in which the DL burst is transmitted (for example, subbands #2 and #3 in FIG. 18), but does not allocate the PDCCH monitoring occasions for those of the LBT subbands in which no DL burst is transmitted (for example, subbands #0 and #1 in FIG. 18).

Further, in Stage 1, the same PDCCH monitoring occasions as in Phase A (in other words, the phase before the DL burst detection) are allocated also in Phase B (in other words, the phase after the DL burst was detected in at least a part of the subbands). Here, in Phase B, the DL burst has already been transmitted in at least one LBT subband.

However, in Phase B, it is possible that the DL burst has been transmitted in not all of the LBT subbands. In this instance, in terminal 200, monitoring of the PDCCH is continued even in the LBT subbands in which the DL burst has not been transmitted in Phase B. For example, in FIG. 18, the PDCCH monitoring occasions are valid also in subbands #0 and #1 during Stage 1, whether in Phase A or in Phase B.

As is understood, the same PDCCH monitoring occasions as those in Phase A (in other words, the phase prior to the DL burst detection) are allocated also in Phase B. With this PDCCH monitoring occasion configuration, for example, when a LBT subband that was unavailable at a time near the beginning of Phase B becomes available in the middle of Phase B, terminal 200 can add the LBT subband for use, and thus, the resource utilization efficiency can be improved.

In addition, in Stage 1, the PDCCH monitoring occasions are mapped to each of the LBT subbands, and it is thus possible for terminal 200 to perform the DL burst detection regardless of which LBT subband is available.

In addition, the number of BDs in the PDCCH monitoring occasion mapped to each symbol in each subband may be configured to, for example, one. This configuration of the number of BDs can suppress an increase in number of BDs in the frequency domain and can increase the number of BDs in the time domain, thus allowing a configuration of PDCCH monitoring occasions in the time domain with finer granularity. For example, in FIG. 18, in Stage 1, the PDCCH monitoring occasions are mapped every two symbols.

Further, for example, a similar (e.g., the same) payload size may be configured between the GC-PDCCH used for the DL burst detection and the PDCCH used for scheduling or the like of a PDSCH. This configuration of the payload size makes it possible for terminal 200, for example, to receive both the GC-PDCCH and the PDCCH by one BD.

As described above, the same PDCCH monitoring occasions are configured for Phase A and Phase B included in Stage 1 corresponding to one slot. It is thus possible, for example, to prevent the scheduling processing of base station 100 or the reception processing of terminal 200 from being complicated.

Further, in Stage 2, the PDCCH monitoring occasions are mapped to the LBT subbands in which the DL burst is detected (for example, subbands #2 and #3 in FIG. 18), and no PDCCH monitoring occasion is mapped to the LBT subbands in which no DL burst is detected (for example, subbands #0 and #1 in FIG. 18).

With this mapping, in Stage 2, no PDCCH monitoring occasion is allocated, for example, in the other LBT subbands than the LBT subbands in which the DL burst is transmitted, and it is thus possible to reduce the number of BDs or CCEs.

In addition, in Stage 2, mapping of the PDCCH monitoring occasions different from those in Stage 1 may be configured. For example, as illustrated in FIG. 18, in Stage 2, one PDCCH monitoring occasion in the time domain may be mapped to each slot. For example, as illustrated in FIG. 18, in Stage 1, the PDCCH monitoring occasions may be mapped in a distributed manner in the time domain, whereas in Stage 2, the PDCCH monitoring occasions may be mapped in a concentrated manner in the time domain. In addition, for example, in the example illustrated in FIG. 18, in each of the subbands, the PDCCH monitoring occasion configured in Stage 2 is mapped in a wider range in the frequency domain as compared with the PDCCH monitoring occasions configured in Stage 1.

Further, as illustrated in FIG. 18, for example, throughout the period of Stage 1, the allocation of the PDCCH monitoring occasions configured for Stage 1 is continued regardless of whether or not the DL burst is detected (in other words, regardless of the Phases). In other words, the PDCCH monitoring occasions are not switched throughout the period of Stage 1. For example, as illustrated in FIG. 18, the PDCCH monitoring occasions may be switched between Stage 1 and Stage 2 (in other words, between the slots). With this switching, the number of times of switching of PDCCH monitoring occasions can be reduced.

As described above, in the present embodiment, base station 100 and terminal 200 determine the PDCCH monitoring occasions (in other words, PDCCH mapping method) in at least one of Phase A (the period on or before the DL burst detection timing), and, Phase B and Phase C (the period on or after the DL burst detection timing) based on, for example, the information on at least one of the maximum number of BDs and the maximum number of CCEs.

For example, in the present embodiment, the allocation of the same PDCCH monitoring occasions (in other words, PDCCH mapping method) is configured for Phase A and Phase B of Stage 1. In addition, the allocation of different PDCCH monitoring occasions between Stage 1 (e.g., Phase A and Phase B) and Stage 2 (e.g., (Phase C)) is configured. In addition, for example, the presence or absence of the PDCCH monitoring occasions in the LBT subbands in which no DL burst is transmitted is switched between Stage 1 and Stage 2.

Such configuration of the PDCCH monitoring occasions makes it possible, for example, to switch the PDCCH monitoring occasions per time resource (e.g., per slot). In other words, the PDCCH monitoring occasions are not switched in the middle of one slot, and it is thus possible, for example, to prevent the scheduling processing of base station 100 or the reception processing of terminal 200 from being complicated. Further, according to the present embodiment, for example, it is possible to allocate the PDCCH monitoring occasions depending on the Phases of the DL burst detection.

Note that the mapping of the PDCCH monitoring occasions in each Stage illustrated in FIG. 18 is an example, and is not limited to the example illustrated in FIG. 18. For example, the number of BDs in the PDCCH monitoring occasion mapped to each symbol of Stage 1 is not limited to one, but a plurality of times of BD may be performed. Further, for example, at least one of the symbol positions and the number of symbols to which the PDCCH monitoring occasions are mapped in Stage 1 and Stage 2 is not limited to the example illustrated in FIG. 18, and may be other positions or another number.

Embodiment 3

For the PDCCH monitoring occasion switching, configuration information on the CORESETs and the SSs corresponding in number to the number of allocation patterns of the PDCCH monitoring occasions may, for example, be prepared. In addition, the PDCCH monitoring occasions can be switched by switching the configuration information on the CORESETs and the SSs. However, as described above, the numbers of CORESETs and SSs that can be configured are limited. Therefore, there is scope for further study on a method for switching the PDCCH monitoring occasions while suppressing increases in the numbers of CORESETs and SSs.

[Configurations of Base Station and Terminal]

The configurations of the base station and the terminal according to the present embodiment may be the same as the configurations of base station 100 and terminal 200 according to Embodiment 1, respectively.

Scheduler 104 of base station 100 according to the present embodiment switches, for example, depending on the present Phase, a dropping rule to be applied. Scheduler 104 may perform SS dropping judgement based on the switched dropping rule, for example.

Like scheduler 104, reception controller 205 of terminal 200 according to the present embodiment switches, depending on the present Phase, the dropping rule to be applied. Reception controller 205 performs SS dropping judgement based on the switched dropping rule, for example.

[PDCCH Monitoring Occasion Determination Method]

An exemplary method for scheduler 104 of base station 100 to determine the PDCCH monitoring occasions will be described. Further, reception controller 205 of terminal 200 may determine the PDCCH monitoring occasions based on the same determination method as that for scheduler 104.

In the present embodiment, base station 100 switches the dropping rule to be applied (in other words, a rule of not configuring the PDCCH monitoring occasions), for example, depending on the Phase (e.g., Phase A. Phase B or Phase C) of the DL burst detection. For example, a dropping rule different for each Phase may be applied. Application of this dropping rule allows configuration of the PDCCH monitoring occasions according to the Phase.

Figure 19:
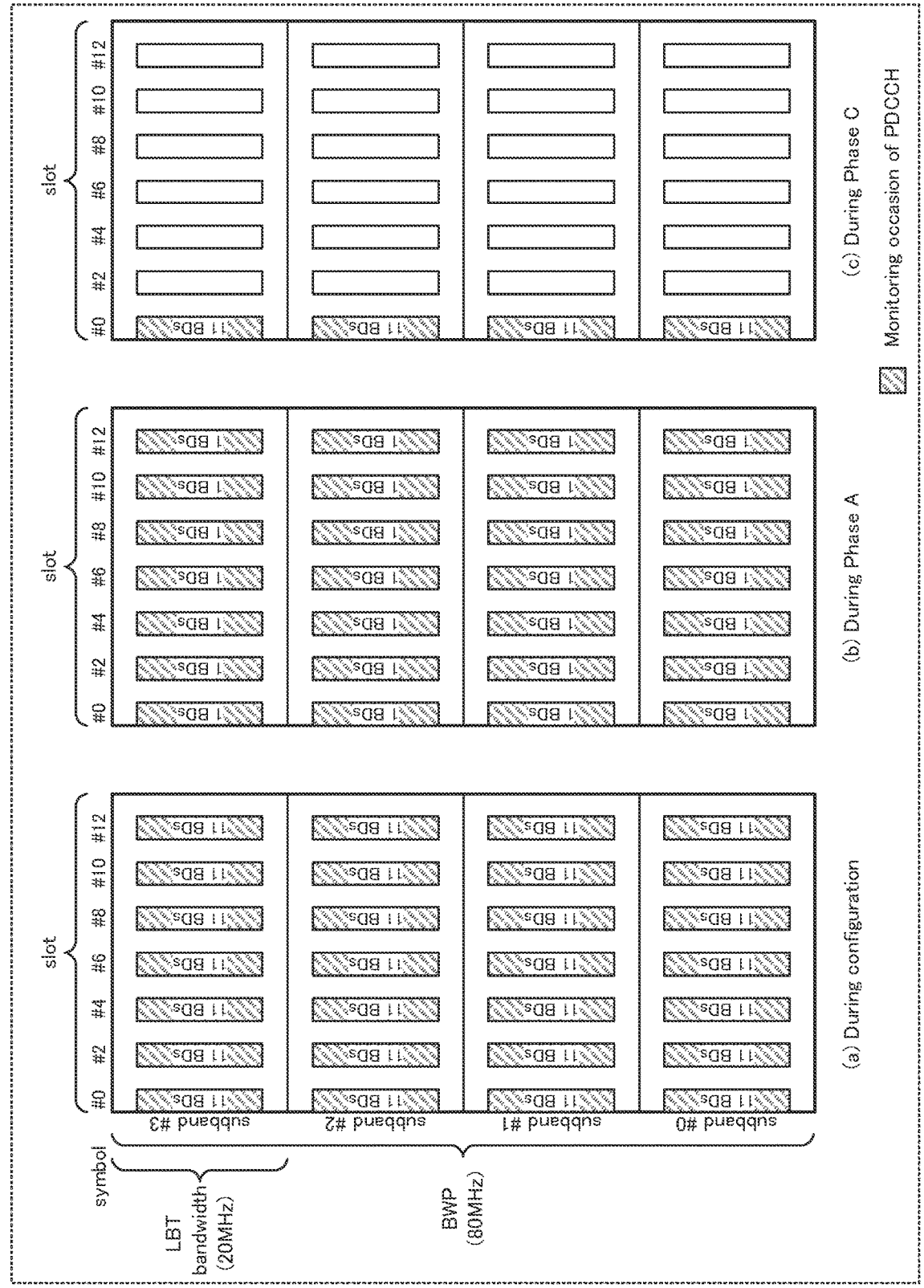
FIG. 19 illustrates an exemplary PDCCH monitoring occasion configuration according to Embodiment 3.

FIG. 19 illustrates exemplary configurations of the PDCCH monitoring occasions according to the present embodiment.

Part (a) in FIG. 19 illustrates an example of the state during configuration of the PDCCH monitoring occasions. At (a) in FIG. 19, the PDCCH monitoring occasions (e.g., SSs or BDs) are configured every two symbols (e.g., at even-numbered symbols) in each LBT subband. Further, the number of PDCCH candidates on the PDCCH monitoring occasion at each symbol in each LBT subband is 11 (in other words, the number of BDs is 11).

Part (b) in FIG. 19 illustrates an exemplary configuration of the PDCCH monitoring occasions in Phase A.

During configuration as illustrated at (a) in FIG. 19. 11 PDCCH candidates (in other words, 11 BDs) are configured for each PDCCH monitoring occasion at each symbol in each LBT subband, whereas at (b) in FIG. 19, one PDCCH candidate (in other words, one BD) is configured. In other words, at (b) in FIG. 19, 10 PDCCH candidates of 11 PDCCH candidates are dropped and one PDCCH candidate is configured.

For example, any of the following methods (1) to (3) may be applied to the dropping rule at (b) in FIG. 19.

(1) All PDCCH candidates with a certain AL except for one PDCCH candidate and PDCCH monitoring occasions are dropped. Regarding a method of selecting one PDCCH candidate, for example, the front PDCCH candidate may be selected, a PDCCH candidate may be randomly selected, a PDCCH candidate may be designated by signaling, or a PDCCH candidate may be selected by other methods.

(2) Priorities are provided based on the AL of PDCCH candidates and the PDCCH candidate numbers in the AL, and a PDCCH candidate and a PDCCH monitoring occasion are dropped when the number of BDs or CCEs configured for terminal 200 exceeds a threshold (e.g., the maximum number of BDs or the maximum number of CCEs).

For example, when ALs 1, 2, and 4 are configured, a rule is assumed under which the ALs are assigned priorities that are higher in the order of ALs 2, 4, 1, and PDCCH candidate numbers are assigned priorities that are higher in ascending order of PDCCH candidate number in the same AL. Note that the PDCCH candidate numbers may correspond to, for example, ms,nCI in Section 10.1 of NPL 3. In the example illustrated at (b) in FIG. 19, when the maximum value of the CCE is 56 CCEs, 4 subbands×7 symbols×2 CCEs=56 CCEs. Each PDCCH candidate with AL 2 is mapped one by one to the PDCCH monitoring occasion at each even-numbered symbol in each LBT subband, and PDCCH candidates and PDCCH monitoring occasions with ALs different from AL 2 are dropped.

(3) PDCCH candidates and PDCCH monitoring occasions are dropped based on SS IDs. In the example illustrated at (b) in FIG. 19, assuming that 11 BDs configured separately between SS ID #1 (the number of BDs=1) and SS ID #2 (the number of BDs=10), the PDCCH candidate for SS ID #1 is mapped to the PDCCH monitoring occasion at each even-numbered symbol in each LBT subband, and the PDCCH candidates and PDCCH monitoring occasions for SS ID #2 are dropped when dropping based on the SS IDs is performed in Phase A.

Part (c) in FIG. 19 illustrates an exemplary configuration of the PDCCH monitoring occasions in Phase C.

At (c) in FIG. 19, for example, in each LBT subband, PDCCH candidates and PDCCH monitoring occasions in symbols #2 to #12 are dropped, and the PDCCH candidates and the PDCCH monitoring occasions in symbol #0 are configured.

For example, any of the following methods (4) or (5) may be applied to the dropping rule at (c) in FIG. 19.

(4) PDCCH candidates and PDCCH monitoring occasions are mapped to symbols in the order starting from the front symbol in the slot, and when the number of BDs or CCEs configured for terminal 200 exceeds a threshold (e.g., the maximum number of BDs or the maximum number of CCEs), the remaining PDCCH candidates and PDCCH monitoring occasions are dropped. In the example illustrated at (c) in FIG. 19, the number of BDs reaches the maximum number of BDs (44) when the PDCCH candidates and the PDCCH monitoring occasions are mapped to symbol #0, and accordingly, PDCCH candidates and PDCCH monitoring occasions for symbols other than symbol #0 are dropped.

(5) PDCCH candidates and PDCCH monitoring occasions are dropped based on SS IDs. In the example illustrated at (c) in FIG. 19, assuming that SS ID #1 (the number of BDs is 11) is configured for symbol #0 and SS ID #2 (the number of BDs is 11) is configured for other symbols than symbol #0, the PDCCH candidates and the PDCCH monitoring occasions at symbol #0 are mapped, and the PDCCH candidates and the PDCCH monitoring occasions at the other symbols than symbol #0 are dropped when dropping based on the SS IDs is performed in Phase C.

Thus, according to the present embodiment, by applying a different dropping rule in each of the Phases, it is possible to configure the PDCCH mapping that is different for each Phase.

Note that, the example illustrated in FIG. 19 has been described in relation to the dropping rules for Phase A and Phase C, but the present disclosure is not limited thereto, and different dropping rules may be applied in each of the Phases. Further, for example, the dropping rule different for each "PDCCH monitoring stage" defined in Embodiment 2 may be applied.

In addition, association between the Phases and the dropping rules may be indicated by base station 100 to terminal 200, for example, using signaling information, or may be defined in specifications (or standards).

As described above, base station 100 and terminal 200 determine the PDCCH monitoring occasion (in other words, PDCCH mapping method) in at least one of Phase A (the period on or before the DL burst detection timing), and, Phase B and Phase C (the period on or after the DL burst detection timing) based on, for example, the information on at least one of the maximum number of BDs and the maximum number of CCEs.

For example, in the present embodiment, base station 100 and terminal 200 configure the dropping rule (in other words, the rule for determining resources to which no PDCCH is mapped) for each Phase of the DL burst detection or for each PDCCH monitoring stage (in other words, each slot). In other words, the dropping rules different depending on the Phases or Stages are configured. This configuration makes it possible for base station 100 and terminal 200 to configure the PDCCH mapping depending on the Phases or Stages. Further, for example, it is possible to change the PDCCH mapping by changing the dropping rule for the same configuration of the CORESET and SS. Thus, the present embodiment can reduce the configured CORESET/SSs as compared with, for example, a method in which the PDCCH mapping is changed by configuring different CORESETs and SSs.

The exemplary embodiments of the present disclosure have been described above.

Other Embodiments

The phrase "PDCCH candidate(s) and PDCCH monitoring occasion(s) are dropped" as used in the above embodiments may be read as "PDCCH candidates and PDCCH monitoring occasions are not mapped." Likewise, the phrase "PDCCH candidate(s) and PDCCH monitoring occasion(s) are not dropped" may be read as "PDCCH candidates and PDCCH monitoring occasions are mapped." Further, the description "PDCCH candidates and PDCCH monitoring occasions are dropped" may include a case where, for example, when a plurality of PDCCH candidates are configured for the same PDCCH monitoring occasion (time/frequency resources), the PDCCH monitoring occasion is not dropped.

In addition, in the above embodiments, the downlink control channel for transmitting the control signal is not limited to the PDCCH, and may be a control channel having another name.

In the above embodiments, the unit of time resource (or the unit time interval) is not limited to a slot or symbol, and may be another unit of time resource (e.g., a subframe, a frame, a minislot, or the like). Further, the unit of frequency resource is not limited to a subband, and may be another unit of frequency resource (e.g., a resource block (PRB: Physical Resource Block), an RB group (RBG), a BWP, a subcarrier, a resource element group (REG), or the like).

Further, the above embodiments may be applied in combination.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A base station according to an exemplary embodiment of the present disclosure includes: control circuitry, which, in operation, determines a mapping method for mapping a downlink control channel signal to at least one of a first period and a second period, the determining being based on information on at least one of a number of times of blind decoding for the downlink control channel signal and a number of resources for channel estimation, the first period being on or before a timing based on carrier sensing, the second period being on or after the timing based on the carrier sensing; and transmission circuitry, which, in operation, transmits the downlink control channel signal based on the mapping method determined.

In an exemplary embodiment of the present disclosure, the mapping method is based on priorities of a plurality of frequency resources.

In an exemplary embodiment of the present disclosure, the mapping method is based on the priorities of the plurality of frequency resources in the first period and is based on one of the priorities of at least one frequency resource of the plurality of frequency resources in the second period, the at least one frequency resource being based on the carrier sensing.

In an exemplary embodiment of the present disclosure, the mapping method does not map the downlink control channel signal based on the priorities when at least one of the number of times of blind decoding and the number of resources exceeds a threshold.

In an exemplary embodiment of the present disclosure, the mapping method configured for the first period is the same as the mapping method configured for a period in the second period, the period being included in a same unit time interval as the first period.

In an exemplary embodiment of the present disclosure, a mapping method different from the mapping method for the first period is configured for a period in the second period, the period being included in a unit time interval different from that of the first period.

In an exemplary embodiment of the present disclosure, the control circuitry configures the mapping method for each of the first period and the second period, or configures the mapping method for each unit time interval, the mapping method including a rule for determining a resource to which the downlink control channel signal is not mapped.

A terminal according to an exemplary embodiment of the present disclosure includes: control circuitry, which, in operation, determines a reception occasion for receiving a downlink control channel signal in at least one of a first period and a second period, the determining being based on information on at least one of a number of times of blind decoding for the downlink control channel signal and a number of resources for channel estimation, the first period being on or before a downlink burst detection timing, the second period being on or after the downlink burst detection timing; and reception circuitry, which, in operation, receives the downlink control channel signal on the reception occasion determined.

A transmission method according to an exemplary embodiment of the present disclosure includes steps performed by a base station of: determining a mapping method for mapping a downlink control channel signal to at least one of a first period and a second period, the determining being based on information on at least one of a number of times of blind decoding for the downlink control channel signal and a number of resources for channel estimation, the first period being on or before a timing based on carrier sensing, the second period being on or after the timing based on the carrier sensing; and transmitting the downlink control channel signal based on the mapping method determined.

A reception method according to an exemplary embodiment of the present disclosure includes steps performed by a terminal of: determining a reception occasion for receiving a downlink control channel signal in at least one of a first period and a second period, the determining being based on information on at least one of a number of times of blind decoding for the downlink control channel signal and a number of resources for channel estimation, the first period being on or before a downlink burst detection timing, the second period being on or after the downlink burst detection timing; and receiving the downlink control channel signal on the reception occasion determined.

The disclosure of Japanese Patent Application No. 2019-184566 dated Oct. 7, 2019 including the specification, drawings and abstract is incorporated herein by reference in its entirety.

INDUSTRIAL APPLICABILITY

An exemplary embodiment of the present disclosure is useful for radio communication systems.

REFERENCE SIGNS LIST

100 Base station
101, 201 Receiver
102, 202 Demodulator/decoder
103 Channel state estimator
104 Scheduler
105, 204 Control information holder
106 Data/control information generator
107, 208 Encoder/modulator
108, 209 Transmitter
200 Terminal
203 DL transmission detector
205 Reception controller
206 Transmission controller
207 Data generator

The invention claimed is:

1. A communication apparatus, comprising:
control circuitry, which, in operation, determines for a downlink control channel a first search space and a second search space different from the first search space;
wherein the first search space for the downlink control channel continues to a boundary of a slot after a detection of a downlink burst, and the second search space for the downlink control channel starts after the boundary of the slot; and
a receiver, which, in operation, receives the downlink control channel;
wherein the downlink control channel is received in the first search space in a first period, and the downlink control channel is received in the second search space in a second period.

2. The communication apparatus according to claim 1, wherein
at least one of the first search space or the second search space has a length of one slot.

3. The communication apparatus according to claim 1, wherein
switching between the first search space and the second search space occurs at the boundary of the slot.

4. The communication apparatus according to claim 1, wherein
the first period includes a period before the detection of the downlink burst and a period after the detection of the downlink burst.

5. The communication apparatus according to claim 1, wherein
a frequency region to be assigned in the second search space is broader than that in the first search space.

6. A communication method, comprising:
determining for a downlink control channel a first search space and a second search space different from the first search space;
wherein the first search space for the downlink control channel continues to a boundary of a slot after a detection of a downlink burst, and the second search space for the downlink control channel starts after the boundary of the slot; and
receiving the downlink control channel;
wherein the downlink control channel is received in the first search space in a first period, and the downlink control channel is received in the second search space in a second period.

7. The communication method according to claim 6, wherein
at least one of the first search space or the second search space has a length of one slot.

8. The communication method according to claim 6, wherein
switching between the first search space and the second search space occurs at the boundary of the slot.

9. The communication method according to claim 6, wherein
the first period includes a period before a detection of a signal transmitted from a base station and a period after the detection until a boundary of a slot, and the second period is a period after the boundary of the slot.

10. The communication method according to claim 6, wherein
a frequency region to be assigned in the second search space is broader than that in the first search space.

* * * * *